US011645939B2

(12) United States Patent
Delson

(10) Patent No.: US 11,645,939 B2
(45) Date of Patent: May 9, 2023

(54) METHOD FOR FREEHAND SKETCH TRAINING

(71) Applicant: THE REGENTS OF THE UNIVERSITY OF CALIFORNIA, Oakland, CA (US)

(72) Inventor: Nathan Delson, San Diego, CA (US)

(73) Assignees: THE REGENTS OF THE UNIVERSITY OF CALIFORNIA, Oakland, CA (US); NATIONAL SCIENCE FOUNDATION, Alexandria, VA (US)

( * ) Notice: Subject to any disclaimer, the term of this patent is extended or adjusted under 35 U.S.C. 154(b) by 601 days.

(21) Appl. No.: 16/701,012

(22) Filed: Dec. 2, 2019

(65) Prior Publication Data

US 2020/0175889 A1 Jun. 4, 2020

Related U.S. Application Data

(60) Provisional application No. 62/774,030, filed on Nov. 30, 2018.

(51) Int. Cl.
*G09B 11/00* (2006.01)
*G06T 7/00* (2017.01)
(Continued)

(52) U.S. Cl.
CPC ............ *G09B 11/00* (2013.01); *G06T 7/0002* (2013.01); *G09B 5/02* (2013.01); *G06F 3/04883* (2013.01); *G06T 2207/30168* (2013.01)

(58) Field of Classification Search
CPC ................................ G09B 11/00; G06T 11/00
See application file for complete search history.

(56) References Cited

U.S. PATENT DOCUMENTS

2009/0068625 A1* 3/2009 Petro .................. G09B 1/00
434/167
2009/0253107 A1* 10/2009 Marggraff ............. G06F 3/0317
434/165

(Continued)

FOREIGN PATENT DOCUMENTS

EP 3206110 A1 * 8/2017 ........... G06F 17/242

OTHER PUBLICATIONS

ATE Impacts, ATE Central—Project Tests Ways to Boost Technical Students' Spatial Skills, Oct. 30, 2018, pp. 2-4, https://atecentral.net/impacts/32441/project-tests-ways-to-boost-technical-students-spatial.

(Continued)

*Primary Examiner* — Peter R Egloff
(74) *Attorney, Agent, or Firm* — Eleanor Musick; Torrey Pines Law Group PC

(57) ABSTRACT

A computer-based method and system for teaching educational sketching includes receiving a user-generated image created in response to a learning assignment and comparing the user-generated image to a solution image to identify one or more errors in the user-generated image relative to the solution image, where the errors may include additional image elements and missing image elements. Comparing is performed by providing a solution region corresponding to an acceptable variation from the solution image and identifying one or more errors based on a presence or absence of at least a portion of a corresponding element of the user-generated image within the solution region. If errors are identified and a non-passing status is determined, a hint is displayed to the user. The hint may be the correct elements of the user-generated image, a portion of the solution image, or a combination thereof.

32 Claims, 31 Drawing Sheets
(15 of 31 Drawing Sheet(s) Filed in Color)

(51) Int. Cl.
*G09B 5/02* (2006.01)
*G06F 3/04883* (2022.01)

(56) References Cited

U.S. PATENT DOCUMENTS

| | | | | |
|---|---|---|---|---|
| 2012/0070809 | A1* | 3/2012 | Chiu | G09B 11/00 434/169 |
| 2014/0045148 | A1* | 2/2014 | Ishiyama | G09B 11/00 434/85 |
| 2014/0071057 | A1* | 3/2014 | Xia | G09B 11/00 345/173 |
| 2014/0108016 | A1* | 4/2014 | Albrecht | G01C 21/367 704/E11.001 |
| 2019/0103061 | A1* | 4/2019 | Rossol | G02F 1/133602 |
| 2020/0082583 | A1* | 3/2020 | Williford | G06F 3/03545 |

OTHER PUBLICATIONS

Cowan, et al., Improvement in Freehand Sketching Application for Spatial Visualization Training, Proc. of the 11th Conference on Pen and Touch Technology in Education (CPTTE 2017), Oct. 12-14, 2017, pp. 1-9.

Digital Animation in Engineering, ASEE Engineering Design Graphics Division, Daniel Webster College, Nashua, NH Oct. 16-18, 2016.

Van Den Einde, et al., Design of a Spatial Visualization App for Increased Student Engagement, 122nd ASEE Annual Conference & Exposition, American Society for Engineering Education, Jun. 14-17, 2015, pp. 1-9.

Delson, N., et al., Tracking Student Engagement with a Touchscreen App for Spatial Visualization Training and Freehand Sketching, 122nd ASEE Annual Conference & Exposition, Jun. 14-17, 2015, Paper ID #13265, p. 26.1595.1-16.

Van Den Einde, L., et al., Increasing Student Persistence in a Sketching App for Spatial Visualization Training. 10th annual International Conference of Education, Research and Innovation (ICERI 2017), Seville, Spain. Nov. 16-18, 2017, pp. 1-9.

Delson, N., et al., Mini-Hints for Improved Spatial Visualization Training, 126th ASEE Annual Conference & Exposition, Jun. 15, 2019, Paper ID #27446, pp. 1-12, doi.org/10.18260/1-2-33112.

Van Den Einde, L., et al., Freehand Sketching on Smartphones for Teaching Spatial Visualization, 126th ASEE Annual Conference & Exposition, Jun. 15, 2019, Paper ID #27617, pp. 1-10, doi.org/10.18260/1-2--32859.

* cited by examiner

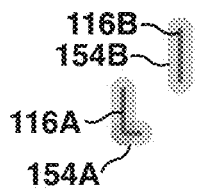
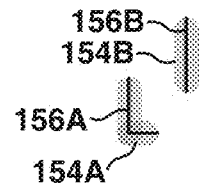
FIG. 3A    FIG. 3B
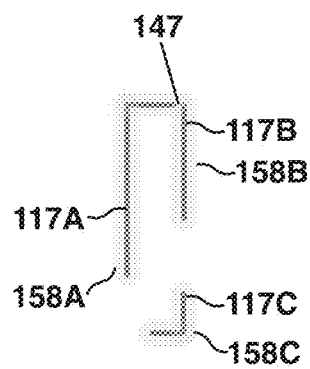
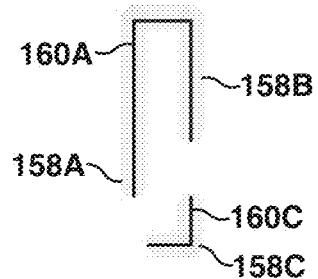
FIG. 3C    FIG. 3D

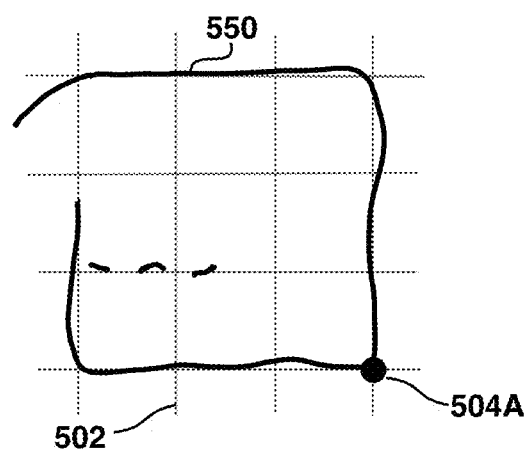
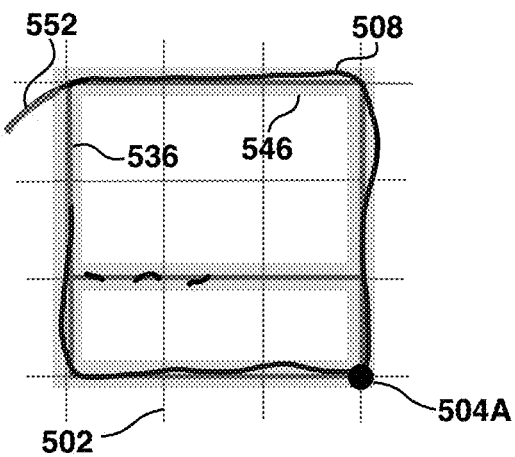
FIG. 23A  FIG. 23B
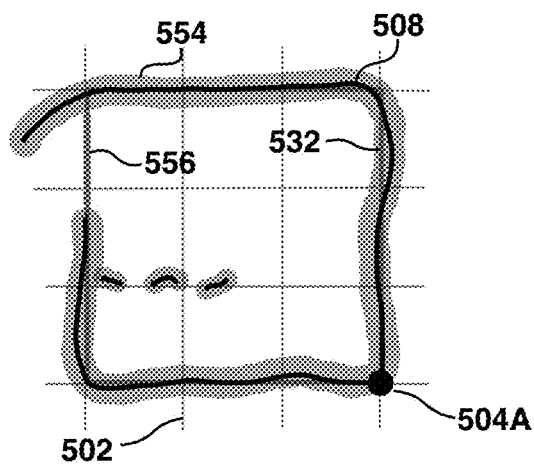
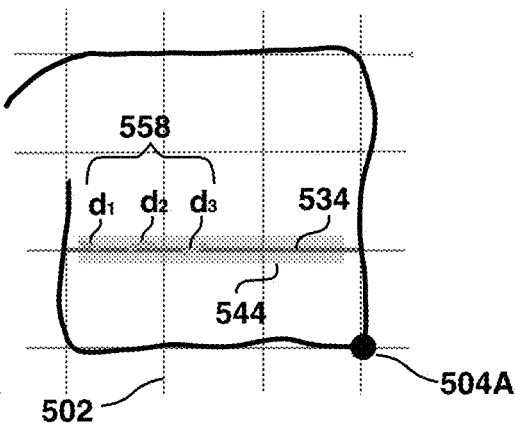
FIG. 23C  FIG. 23D

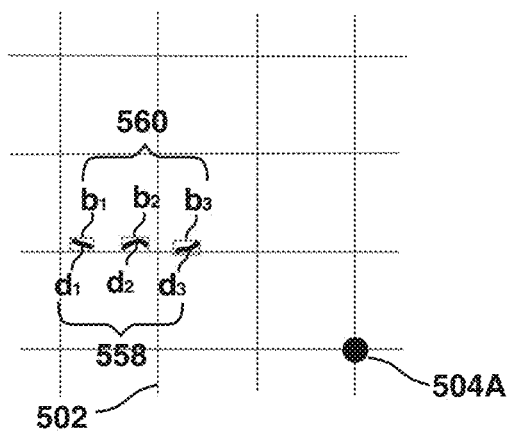
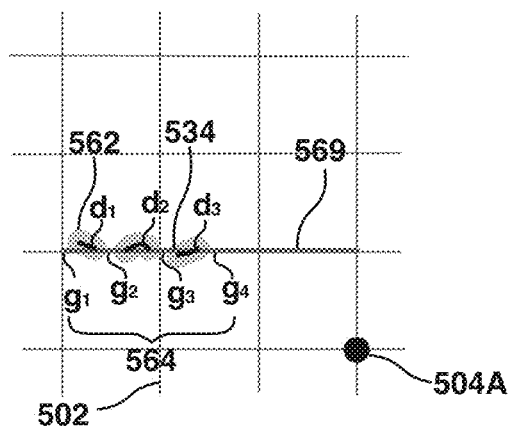
FIG. 23E
FIG. 23F
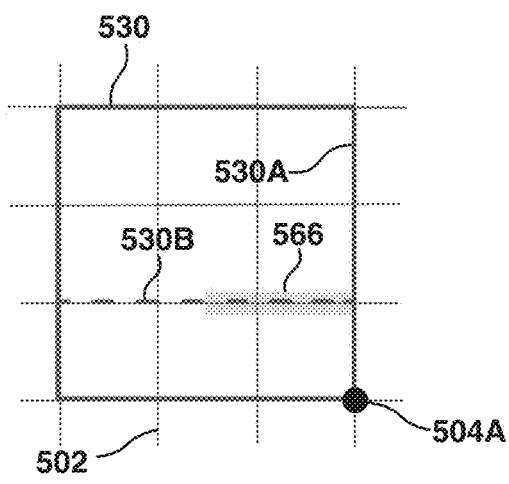
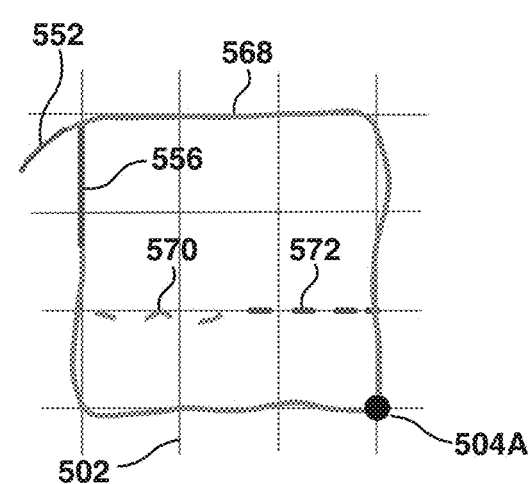
FIG. 23G
FIG. 23H

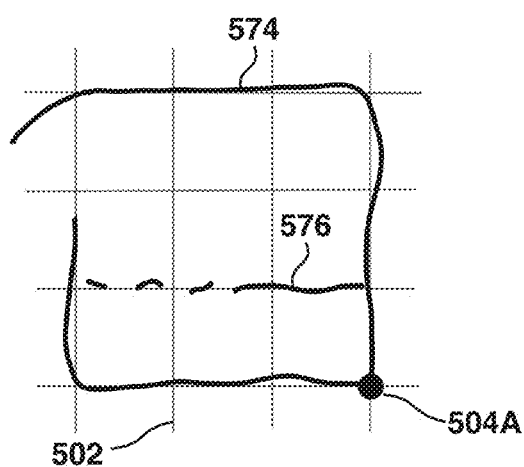
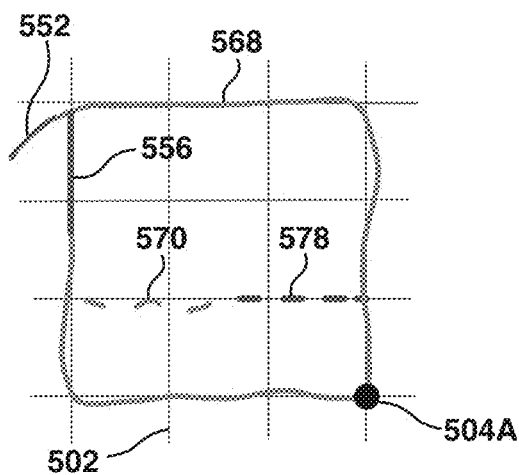
FIG. 24A     FIG. 24B
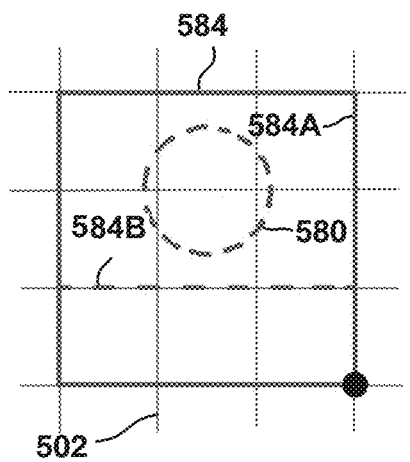
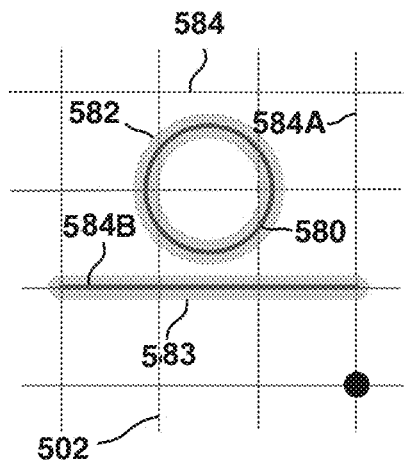
FIG. 25A     FIG. 25B

METHOD FOR FREEHAND SKETCH TRAINING

RELATED APPLICATIONS

This application claims the benefit of the priority of Provisional Application No. 62/774,030, filed Nov. 30, 2018, which is incorporated herein by reference in its entirety.

GOVERNMENT RIGHTS

This invention was made with government support under Grant No. DUE1407123 awarded by the National Science Foundation. The government has certain rights in the invention.

FIELD OF THE INVENTION

The present invention relates to a method and computer-based system for teaching spatial visualization and hand sketching skills through the use of grading algorithms that provide real time feedback.

BACKGROUND

Sketching is a valuable skill for communicating ideas quickly and aids in the creative process. In addition, sketching of 2 Dimensional (2D) and 3 Dimensional (3D) shapes has been shown to increase spatial visualization skills which is a skill that allows one to visualize and manipulate 2D and 3D shapes in one's mind. Sketching and spatial visualization skills are important in many Science, Technology, Engineering and Math (STEM) fields. Examples of the types of sketches used in engineering include orthographic and isometric views.

Sketching is also broadly used in education. Elementary school students draw sets of blocks when learning addition and draw pie charts when learning about fractions. Math students sketch different functions and physics students sketch forces and motion trajectories. In general, sketching is broadly used and is important in careers beyond STEM such as fashion design, interior design, and construction. Spatial visualization skills are important in careers ranging from computer game design to surgery.

Indeed, training in freehand sketching skills has been shown to increase spatial visualization, Grade Point Averages (GPAs), and graduation rates in STEM at the college level as described in "Spatial Skills Training to Improve Student Success in Engineering," by S. A. Sorby in a 2012 Specialist Meeting—Spatial Thinking Across the College Curriculum, pp. 1-4. Traditionally, sketching is taught with paper and pencil. The student turns in their paper and then waits, often days, before their work is graded and returned. If a student has a question on a given assignment, they often have to wait to get access to an instructor to provide guidance. It is desirable for students to have faster feedback on their sketching work and reduce the grading work of on the instructor.

Computers and technology have been developed to assist in a range of educational areas. However, many technology-assisted learning methods use multiple-choice questions as a primary assessment method. There are numerous limitations of multiple-choice questions. One limitation is that if a student gets a multiple-choice question wrong, they cannot meaningfully try the same question again since they know that one of the options has been removed. It would be advantageous to provide students with questions that are more real-world than multiple-choice questions. Also, it would be advantageous to have assignments that a student can be attempt multiple times if their early attempts are incorrect. The ability to stick with a problem until it is completed correctly is a type of persistence that has been shown to correlate with academic success. It is desirable for a training method to encourage and reward persistence. It is also desirable for a teacher to be able to measure a student's persistence so that they can know which students need specific help.

Another limitation of multiple-choice questions is that the feedback provided to the students is typically limited to whether they answered the question correctly or incorrectly. In some cases, feedback may explain the reason for the correct results, but this feedback is typically not customized to the student work that lead to the error (most multiple-choice methods are not aware of the student work, only their final selection). However, an expert teacher interacting with a student can provided feedback to a student that is customized to the needs of a specific student and to the specific errors that the student might be making. There is a need in technology assisted learning to provide high quality feedback to students.

Another limitation of multiple-choice questions is that the teacher does not have information of why the students made a certain error, or how much effort they put into a specific assignment. One student may quickly guess answers to a set of multiple-choice questions and get some of them correct by chance. While another student may put a lot of effort into a set of multiple-choice questions yet get some of them wrong due to a conceptual error about the material. An expert teacher may want to encourage the student working too quickly to put more effort into their work and be more persistent. The expert teacher may want to provide the students with conceptual errors with specific hints and guidance. However, with traditional multiple-choice questions, the teacher does not get specific information about the amount of effort or reasons for a student's errors. It is desirable for educational technology to provide the teacher with specific information about each student, such as persistence and the types of errors they are making. The teacher could then target their effort to students who need more direct guidance, while letting other students work more independently.

When teaching sketching, an expert teacher will be able to distinguish appropriately between a correct sketch and an incorrect sketch. An expert teacher may notice on a student's sketch a stray mark, but still grade that sketch as correct because they recognize this stray mark as unintentional by the student. On the other hand, when a student makes a conceptual error, the marks on the page are intentional, and an expert teacher would recognize this as incorrect. There are other factors that an expert teacher would consider when grading a sketch. Accordingly, if one was to implement a technology assisted method for sketch training, it would be important that an automated grading method be developed that properly grades students' sketches. This automated grading methods should not be too lenient or too strict. At times, it would be advantageous for the automated grading method to distinguish between intentional and unintentional marks by the students.

In summary, there is a need for a more effective and engaging method to teach sketching skills and other topics in which sketching is utilized. It would be advantageous for this method to provided immediate feedback to the students similar to the feedback that an expert teacher would provide.

It can also be advantageous for the method to encourage student persistence and provide information to the instructor about the level of effort and type of mistakes a student is making.

BRIEF SUMMARY

An object of the invention is to provide a computer-based method for teaching skills that utilize sketching that can be applied in a wide range of applications. A user or student will be presented with a sketching assignment. The assignments can relate to 2-dimensional (2D) or 3-dimensional (3D) visualization and technical drawings such as 3D isometric views or 2D orthographic views including top, side, and front views. The assignments can require mental rotation or assembly of objects, and then have the student sketch the resulting shape. The assignments could relate to fundamental arithmetic and include drawing sets of blocks. Math topics such as ratios could be taught by having students fill in pie-charts. Sketching assignments can be implemented for specific fields such as drawing anatomical shapes for surgery students or geometry of plate tectonics for geologists. This is only a partial list, as sketching is employed in a wide range of educational areas. Accordingly, the term "educational sketching" is used herein to describe any educational activity in which students sketch as part of the learning or assessment process.

The method of training can be implemented using a touchscreen computer or other computing device with a user interface such as a mouse, touchpad, or track ball or similar input tool that is capable of generating an image of the user's input for display on a screen. The user may sketch with their finger, stylus, or other input device. After the user completes a sketch, they can select a submit button. A computer software program stored within the device memory in communication with a processor will grade the sketch and determine if it is drawn correctly according to the assignment. The program will then generate an alert on the interface screen indicating whether their sketch was correct or incorrect. The grading approach may emulate that of an expert teacher, providing grades that are not merely pass if perfect and fail otherwise, but graded based on degrees or levels of correctness. For example, a sketch can still be graded as "correct" even if there are small deviations from the desired solution, or if there are inadvertent marks within the sketch area. However, if the deviations from the desired solution exceed a pre-determined level, or the user makes intentional marks that are erroneous, the sketch could fail depending on the criteria applied as part of the grading process. By distinguishing between intentional and unintentional user marks on the sketch image, the software program will not grade too strictly or too leniently.

An additional important feature of the invention is the ability to provide feedback to the user. If the user is working independently and they complete the assignment incorrectly, they may need assistance to guide them toward the correct solution. However, as expert teachers know, it can detract from the learning experience to reveal the solution to a student too early. Instead, it would be preferred to provide incremental guidance such as one or more small clues that allow the student to figure out for themselves what the next steps are to achieve the correct result. Accordingly, when the student receives the alert that their sketch is incorrect, they can be provided with three options. The first option is to try again on their own, the second option is to request a hint that is customized based upon their prior attempt, and a third option is to take a peek at the solution. The student is encouraged to take the first option, and only if stuck look at a hint. Peeking at the solution should be reserved as a last resort. The ability to retry an assignment distinguishes this approach from traditional multiple-choice questions which can typically only be tried once. Retrying assignments until success is a way to develop student persistence as well as to allow the student to recognize which mistakes led them to the prior incorrect result.

One approach for providing a hint is to show the user what components of the sketch they drew correctly, but without showing them the missing components. Another approach for providing feedback is implemented when the student is still stuck after a hint. At that point, the student's sketch is shown in a way that illustrates the mistakes they made and which part(s) of the solution they missed. For example, the erroneous parts of the student's sketch could be shown in red, the correctly drawn parts shown in green, and the missing parts shown in blue. To implement this feature, the inventive software program distinguishes between the erroneous, correct, and missing parts of a sketch. This type of customized feedback can provide the experience of an expert teacher sitting by the student's side providing real-time guidance as they complete the assignment.

The inventive teaching approach includes communication of an assignment to a student, which can be done with text, still images, moving images such as animations, interactive images, oral instructions, other sound communication, haptic communication, or other sensory signals to the user. The communication of an assignment can be via display on a computer monitor or device screen, virtual or augmented reality goggles, printed or drawn on a piece of paper, a projection, or other communication method.

The student can complete the assignment in whole or in part through creating an image. The image may be 2D or 3D, a sketch composed of lines or solid shapes, a drawing, a painting, or other type of image generated by applying pressure to a touchscreen, or using another interface device. Input devices are commercially available that allow the user's hand motion to be sensed and converted into cursor movement on a device screen. For example, the MICROSOFT® Kinect™ device uses optical sensing, while Ascension Technology Corp's BIRD™ line of motion capture products employs various combinations of magnetic, optical, and inertial motion tracking technologies. Technologies are also available, particularly for use by the disabled, for sensing tongue motion, eye motion, or electrical signals on the surface of the skin, for conversion into cursor movement on a device screen which may be used to generate sketches. The image may simply be created by drawing on a piece of paper, which is then photographed or scanned to generate a digital image. User motion could be translated into 2D or 3D images, creating lines, areas, surfaces, or volumes. User-selectable options may allow the user to generate solid lines, dotted lines or dashed lines with a continuous sweeping motion across the sketch area, as well as selecting the thickness of the lines. Alternatively, line thickness could depend on the pressure exerted on a touchscreen. User-selectable options could be used to generate brush strokes, paint or fill patterns, or other patterns. The type of sketches could be line drawings, can include filled shapes, or include other variations in the appearance of the image. The sketch solution could include combinations of solid lines and dashed lines as are used in technical drawing to designate hidden lines. Colors can be used to designate certain aspects of a sketch.

In some embodiments, the screen display on which the student will be drawing may include a visible grid. Other drawing aids that can be provided include snap-to-grid or snap-to-object to place components of a drawing at specific locations. For example, snap-to-grid may place the start and end points of a line at grid locations, which may be visible or not. Snap-to-object may place the beginning of a new line at the end, start, or midpoint of an existing line. Drawing aids may help create straight lines between start and end points, allowing a user to specify that a line be straight by pausing at the beginning or end point of a line, while allowing the user to draw lines that are not straight by not pausing at the beginning or end points. Drawing aids may allow a user to select predefined shapes, such as lines, rectangles, circles, ellipses, triangles, or other shapes, which may be resized by dragging edges of the line or shape.

The student can complete the assignment in whole or in part through creation of a shape, which may be 2D or 3D. The shape could be generated by drawing as described above, or the shape could be a 3D object formed from modeling clay, wood, paper mâché, or building sets such as LEGO® or TINKERTOY® for example, or 2D objects created by cutting and/or pasting paper or other sheet material, or other methods of forming. The shapes formed could then be scanned using 2D or 3D scanners, or photographed, and converted to a digital image for analysis.

Feedback can be provided to the user using a number of different approaches. The correctness or errors in a sketch (or other creation) could be communicated visually, acoustically, with haptics, or through other means of generating sensory input to the user. If the feedback is provided visually it could be through static images, animations, interactive 3D images and shapes, video clips, or other visual means. The feedback can include text information.

The inventive scheme has numerous benefits over existing approaches. Many existing electronic learning methods use multiple-choice questions. If a student gets a multiple-choice question wrong, they cannot try the exact same problem again because one of the solutions has already been eliminated. This is a disadvantage because it does not encourage students to develop persistence and keep working on a problem until they get it correct. Another disadvantage of multiple-choice-based learning is that a student may get the correct answer purely by chance, in which case the teacher will not know whether the student has actually gained the knowledge being tested. Traditional multiple-choice has limited ability to provide customized feedback, since the student has only a limited number of selections, and the teacher cannot evaluate the student's thought process in coming up with their answer. Some traditional teaching methods provide the user with the solution to a problem if they get stuck, yet providing a solution too quickly to the student can interfere with the development of analytical skills that could allow them to reach the correct answer on their own. The approach presented herein allows for feedback that is customized and unique for every sketch submitted. The inventive learning system employs software configured to evaluate and classify different aspects of a submitted sketch, and provides feedback to the students to see specifically where and what type of mistake was made. A key benefit of inventive scheme is that it can present to a student only a partial solution in the form of a hint, so that a stymied student can still complete the assignment on their own and be rewarded for demonstrating persistence. This hint in the form of a partial solution can be customized and based on the work the student has submitted. In some embodiments, the student's completed assignments can be exported from the student's device for download and storage on a computer or device controlled by the teacher. This variation allows the teacher to see the types of mistakes a specific student may be making, to allow personalized guidance for that student, as well as to identify where common mistakes may be occurring within a group of students. In other embodiments, a student may export their sketch to another student's device to allow collaboration on a drawing assignment.

This invention provides the ability for students to work independently on sketching assignments while providing real time feedback to each student. This invention also simplifies the task of grading student work. Overall, sketching assignments as contemplated herein can increase a student's spatial visualization ability, help with STEM subjects, as well as enhancing creativity, concept generation, and teamwork.

In one aspect of the invention, a method for teaching educational sketching includes: (a) receiving in a computing device via a device interface a user-generated image created by a user in response to a learning assignment, wherein the computing device generates a graphical display comprising groupings of pixels within the graphical display, each grouping of pixels comprising an element of the user-generated image; (b) comparing the user-generated image to a solution image to identify one or more errors in the user-generated image relative to the solution image, wherein the one or more errors comprise one or more of additional image elements and missing image elements, wherein the comparing comprises, for each element of the solution image: (i) providing a solution region comprising an area encompassing each element of the solution image, the solution region corresponding to an acceptable variation from the solution image; and (ii) identifying one or more errors based on a presence or absence of at least a portion of a corresponding element of the user-generated image within the solution region; (c) if one or more errors are identified, determining a magnitude of each error and comparing the magnitude of the error to a threshold; (d) indicating a non-passing status if the magnitude of the error exceeds the threshold; (e) if non-passing status is indicated, generating at least one hint for display to the user, the at least one hint comprising one or more of at least a portion of the error, at least a portion of correct elements of the user-generated image, and at least a portion of the solution image to the user; (f) generating a prompt to the user to input a new user-generated image; (g) repeating steps (a) through (f) until the magnitude of the error does not exceed the threshold and a passing status is achieved; and (h) displaying an indication of the passing status of the user-generated image on the graphical display.

In some embodiments, the device interface is selected from the group consisting of a touchscreen, a computer mouse, a trackball, a camera, an image scanner, and a motion sensor. The display device and the device interface may be embodied in a touchscreen.

The user-generated image includes one or more user-generated elements, each user-generated element comprising a corresponding contiguous grouping of pixels, wherein the solution region comprises a set of pixels, wherein the error is identified as a missing image element when a portion of the user-generated element is not present within the set of pixels and is identified as an additional image element when a portion of the user-generated elements is present outside of the pixel region.

The solution image may include one or more dashed lines and the solution region includes a dashed line solution region, wherein the error is identified as an excessively long dash when the user-generated element corresponding to the dashed line has one or more dashes within the dashed line solution region having a magnitude that exceeds a threshold for an acceptable dash. The error is identified as an excessively long gap when the user-generated element corresponding to the dashed line has one or more gaps with a magnitude that exceeds a threshold for an acceptable gap.

The at least one hint includes a visually encoded image displaying a solution image having visually distinguishable indicators of missing and/or additional components, where the visually perceptible indicators may be color coded lines, where a different color corresponds to each of correct, missing, and additional elements.

Alternatively, the at least one hint may be a visually encoded image displaying the user-generated image with additional visually distinguishable indicators of missing and/or additional components. The visually perceptible indicators may be color coded lines, wherein a different color corresponds to each of correct, missing, and additional lines.

In some embodiments, the at least one hint may include portions of the solution image corresponding to the correct elements of the user-generated image. Additional hints may include visually distinguishable image elements corresponding to portions of the solution image that are missing from the user-generated image and/or visually distinguishable image elements corresponding to portions of the user-generated image that are not part of the solution image.

In another aspect of the invention, a system for teaching educational sketching includes a computing device having a device processor and a device memory; and a device interface associated with the computing device, the device interface configured for entry of a user-generated image created by a user in response to a learning assignment, wherein the device processor has associated therewith a set of non-transitory instructions configured to cause the device processor to execute the steps of: (a) receiving the user-generated image and generating a graphical display thereof comprising groupings of pixels, each grouping of pixels comprising an element of the user-generated image; (b) comparing the user-generated image to a solution image to identify one or more errors in the user-generated image relative to the solution image, wherein the one or more errors comprise one or more of additional image elements and missing image elements, wherein the comparing comprises, for each element of the solution image: (i) providing a solution region comprising an area encompassing each element of the solution image, the solution region corresponding to an acceptable variation from the solution image; and (ii) identifying one or more errors based on a presence or absence of at least a portion of a corresponding element of the user-generated image within the solution region; (c) if one or more errors are identified, determining a magnitude of each error and comparing the magnitude of the error to a threshold; (d) indicating a non-passing status if the magnitude of the error exceeds the threshold; (e) if non-passing status is indicated, generating at least one hint for display to the user, the at least one hint comprising one or more of at least a portion of the error, at least a portion of correct elements of the user-generated image, and at least a portion of the solution image to the user; (f) generating a prompt to the user to input a new user-generated image; (g) repeating steps (a) through (f) until the magnitude of the error does not exceed the threshold and a passing status is achieved; and (h) displaying an indication of the passing status of the user-generated image on the graphical display.

The device interface is selected from the group consisting of a touchscreen, a computer mouse, a trackball, a camera, an image scanner, and a motion sensor.

The user-generated image includes one or more user-generated elements, each user-generated element comprising a corresponding contiguous grouping of pixels, wherein the solution region comprises a set of pixels, wherein the error is identified as a missing image element when a portion of the user-generated element is not present within the set of pixels and is identified as an additional image element when a portion of the user-generated elements is present outside of the pixel region.

The solution image may include one or more dashed lines and the solution region includes a dashed line solution region, wherein the error is identified as an excessively long dash when the user-generated element corresponding to the dashed line has one or more dashes within the dashed line solution region having a magnitude that exceeds a threshold for an acceptable dash. The error is identified as an excessively long gap when the user-generated element corresponding to the dashed line has one or more gaps with a magnitude that exceeds a threshold for an acceptable gap.

The at least one hint includes a visually encoded image displaying a solution image having visually distinguishable indicators of missing and/or additional components, where the visually perceptible indicators may be color coded lines, where a different color corresponds to each of correct, missing, and additional elements.

Alternatively, the at least one hint may be a visually encoded image displaying the user-generated image with additional visually distinguishable indicators of missing and/or additional components. The visually perceptible indicators may be color coded lines, wherein a different color corresponds to each of correct, missing, and additional lines.

In some embodiments, the at least one hint may include portions of the solution image corresponding to the correct elements of the user-generated image. Additional hints may include visually distinguishable image elements corresponding to portions of the solution image that are missing from the user-generated image and/or visually distinguishable image elements corresponding to portions of the user-generated image that are not part of the solution image.

In still another aspect of the invention, a method for teaching educational sketching includes (a) receiving in a computing device via a device interface a user-generated image created by a user in response to a learning assignment, wherein the computing device generates a graphical display comprising groupings of pixels within the graphical display, each grouping of pixels comprising an element of the user-generated image; (b) comparing the user-generated image to a solution image to identify one or more errors in the user-generated image relative to the solution image, wherein the one or more errors comprise one or more of additional image elements and missing image elements, wherein the comparing comprises, for each element of the solution image: (i) providing a solution region comprising an area encompassing each element of the solution image, the solution region corresponding to an acceptable variation from the solution image; and (ii) identifying one or more errors based on a presence or absence of at least a portion of a corresponding element of the user-generated image within the solution region; (c) if one or more errors are identified, determining a magnitude of each error and comparing the magnitude of the error to a threshold; (d) indicating a non-passing status if the magnitude of the error exceeds the threshold; (e) if non-passing status is indicated, generating at least one hint for display to the user, the at least one hint comprising portions of the solution image corresponding to correct elements of the user-generated image; (f) generating a prompt to the user to input a new user-generated image; (g)

repeating steps (a) through (f) until the magnitude of the error does not exceed the threshold and a passing status is achieved; and (h) displaying an indication of the passing status of the user-generated image on the graphical display.

The at least one hint may further include visually distinguishable image elements corresponding to portions of the solution image that are missing from the user-generated image and/or visually distinguishable image elements corresponding to portions of the user-generated image that are not part of the solution image.

In yet another aspect of the invention, a method for teaching educational sketching includes: (a) receiving in a computing device via a device interface a user-generated image created by a user in response to a learning assignment, wherein the computing device generates a graphical display comprising groupings of pixels within the graphical display, each grouping of pixels comprising an element of the user-generated image; (b) comparing the user-generated image to a solution image to identify one or more errors in the user-generated image relative to the solution image, wherein the one or more errors comprise one or more of additional image elements and missing image elements; (c) if one or more errors are identified, indicating a non-passing status and generating at least one hint for display to the user, the at least one hint comprising portions of the solution image corresponding to correct elements of the user-generated image; (d) generating a prompt to the user to input a new user-generated image; (e) repeating steps (a) through (d) until a passing status is achieved; and (f) displaying an indication of the passing status of the user-generated image on the graphical display. The correct elements of the user-generated image correspond to elements of the user-generated image that are disposed within a specified region surrounding each element of the solution image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other features, aspects, and advantages of the present invention will become better understood with regard to the following description, appended claims and accompanying drawings, where:

FIG. 3A shows missing image components and regions of missing image components FIG. 3B shows extended missing image components and regions of missing image components FIG. 3C shows credited components of a solution image and regions of credited components of a solution image.

FIG. 3D shows extended credited components of a solution image and regions of credited components of a solution image.

FIG. 23A shows a sketch for the Front View of the assignment in FIG. 19A, where there is additional image components, missing image components, and an excessively long gap in a dashed line location.

FIG. 23B shows the sketch of FIG. 23A where an additional image component is identified.

FIG. 23C shows the sketch of FIG. 23A where a missing solid line image component is identified.

FIG. 23D shows the sketch of FIG. 23A where marks in a dashed line solution region are identified.

FIG. 23E shows the sketch of FIG. 23A where dashes in a dashed line solution region are identified.

FIG. 23F shows the sketch of FIG. 23A where gaps in a dashed line solution region are identified.

FIG. 23G shows a region for missing dashed line locations for the sketch shown in FIG. 23A.

FIG. 23H shows a feedback image for sketch of FIG. 23A which shows correct solid line components, additional image components, missing solid image components, correct dashed line components, and missing dashed line components.

FIG. 24A shows a sketch for the Front View of the assignment in FIG. 19A, where there is additional image components, missing image components, and an excessively long dash in a dashed line location.

FIG. 24B shows a feedback image for sketch of FIG. 24A which shows correct solid line components, additional image components, missing solid image components, correct dashed line components, and location of erroneously drawn solid line components in a dashed line location.

FIG. 25A shows a sketch solution for an assignment that includes solid and dashed lines as would be drawn by a draftsman including straight and curved lines.

FIG. 25B shows a solution region of dashed line locations including straight and curved lines.

DETAILED DESCRIPTION OF EMBODIMENTS OF THE INVENTION

Figure 1:
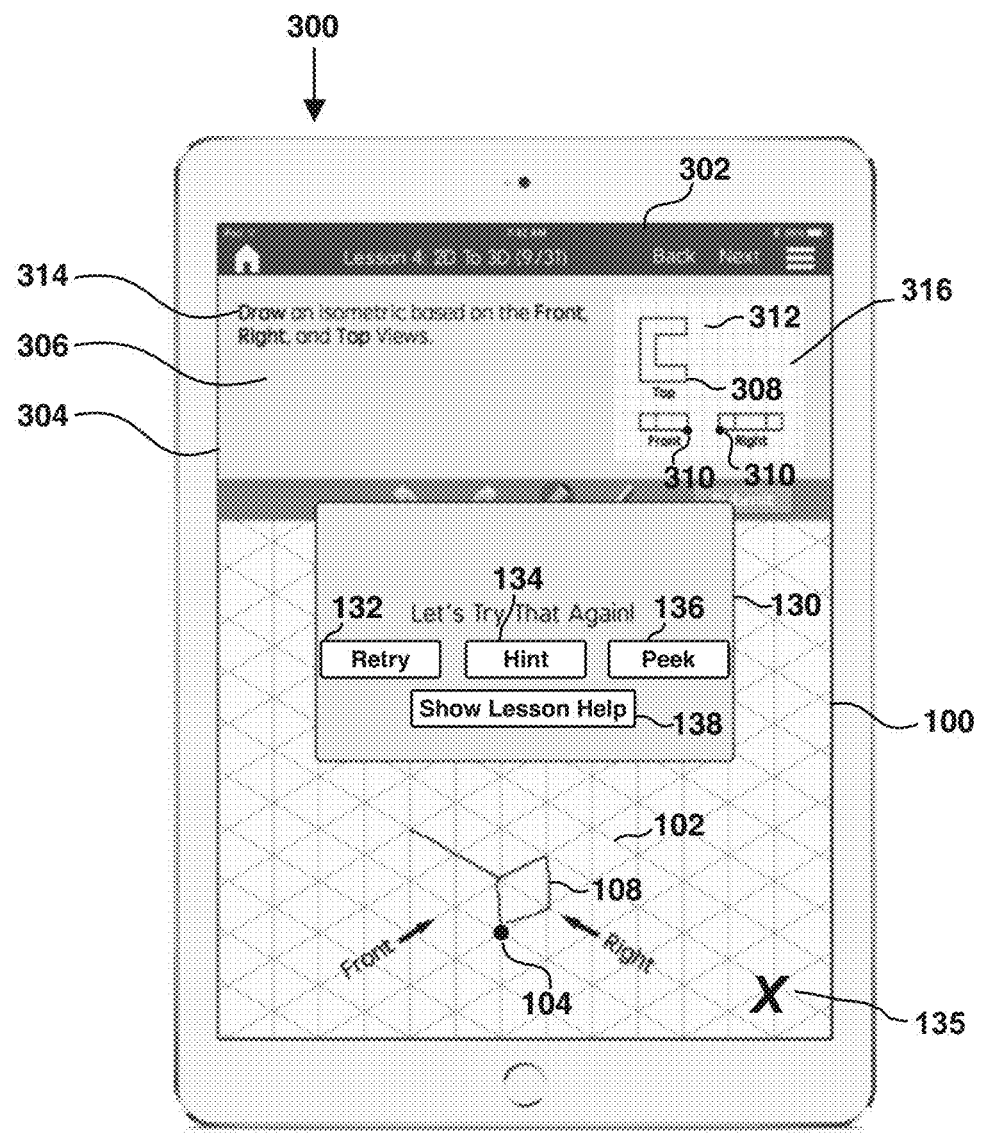
FIG. 1 shows a touchscreen device with a user interface, an assignment window, and sketching window.
Figure 2A:
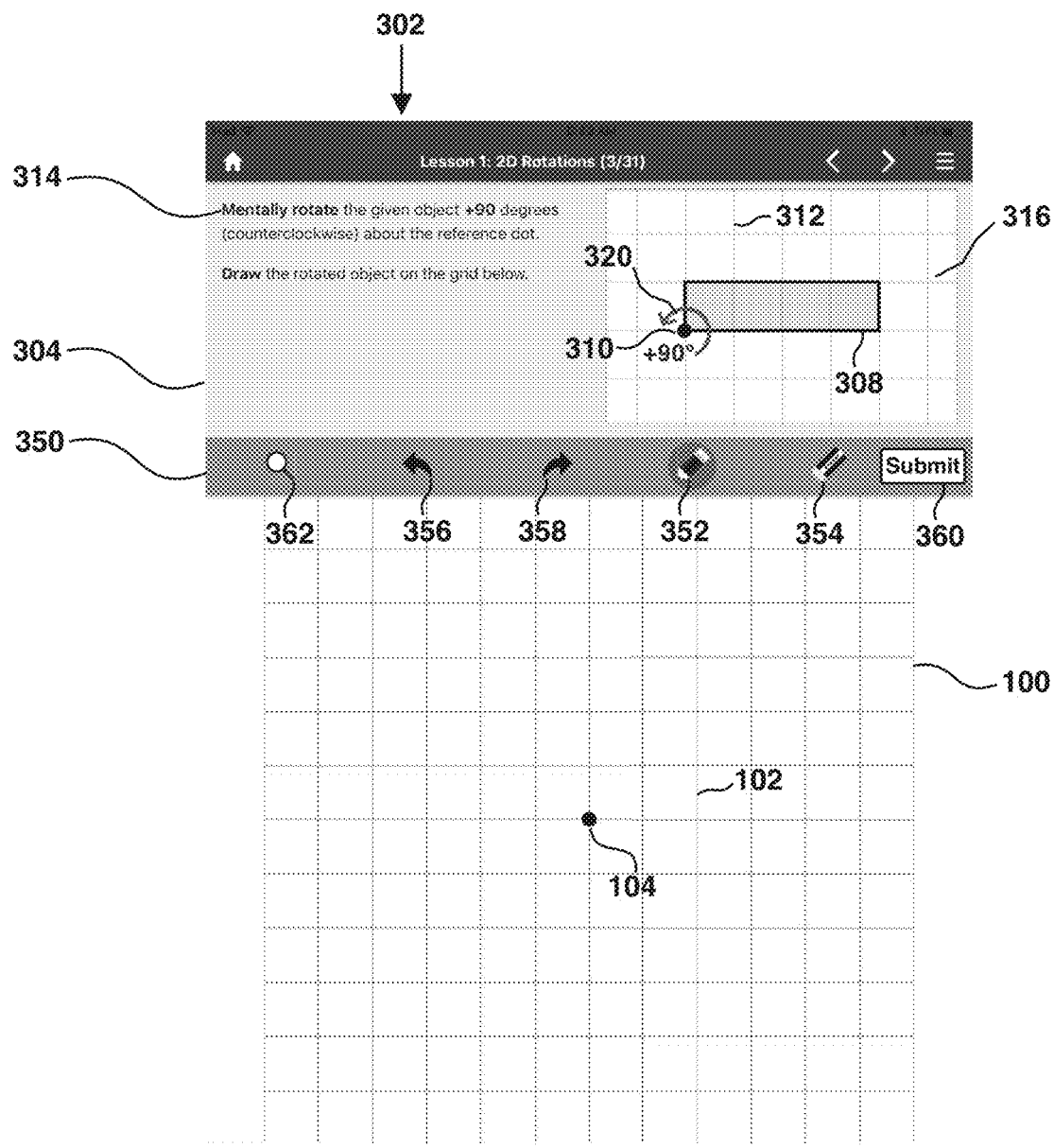
FIG. 2A shows a user interface with an assignment window and sketching window.

The inventive training method and system are implemented using a computing device that includes a processor programmed with instructions to execute a series of steps, examples of which are described in the following. For purposes of illustration, embodiments of the inventive computer-based method are described with reference to an exemplary touchscreen device such as the tablet computer 300 shown in FIG. 1. The tablet computer 300 can be an Apple® iPad®, Microsoft® Surface® or Samsung® Galaxy®, a smartphone, or other similar touchscreen device. The touchscreen 302 can display an assignment window 304 and a sketch window 100. The assignment window 304 includes an assignment description 306 which further includes one or more assignment FIG. 316 and an assignment text description 314. The relative positions of the assignment and sketch windows shown in the figures are provided as examples only. It will be readily apparent to those in the art that the relative locations may be reversed, e.g., switching top and bottom, or may appear in a landscape versus portrait orientation with the windows side by side. The assignment FIG. 316 can include an assignment image 308, descriptive text, e.g., "top", "front", right", and indicators for image movement, such as an arrow 320 and/or an amount of rotation or movement, as shown in FIG. 2A. The assignment description 314 can be a text description of the objective of the assignment. In the example provided in FIGS. 2A-2J, the assigned exercise is to "Mentally rotate the given object +90 degrees (counterclockwise) about the reference dot. Draw the rotated object on the grid below." The assignment area 316 can include an assignment reference dot 310 and an assignment grid 312.

While the description herein refers to a touchscreen, it will be readily apparent that a variety of different devices and techniques may be used to generate a sketch image and store the sketch image in a computer memory for evaluation and grading. In the examples described, the student can use a finger or stylus on a touchscreen, with lines being generated by tracing a finger or stylus on the touchscreen. The lines generated could be thick or thin and could be drawn in a range of colors. Lines could be generated freehand with a snap-to-grid feature common in many drawing packages. The pressure that the user applies to the touchscreen can correlate to the thickness and color of lines drawn. In one alternate approach, the user could draw an image on a piece of paper or other medium, and then scan or photograph the image in order to digitize the image for entry into a computer memory. The user may also use a computer mouse, trackpad, or roller ball in communication with a personal computer, laptop, or other computing device, to generate an image on a monitor, which image is then stored in the computer's memory for processing by the evaluation and grading program. The sketched image could be done in 2D or 3D. To generate a 3D image, a user could use an input device such as an Ascension TRAKSTAR™ system or other 3D input device. Accordingly, while this detailed description provides illustrative examples of a user employing a touchscreen to generate components of the sketch using their finger or stylus, it should be understood that the inventive method relates to a student (or other user) utilizing any combination of computing and interface devices and methods to generate sketch images that may be stored in the device's memory for analysis using the grading and teaching methods of the inventive scheme. Accordingly, for purposes of the present description, the term "device" refers to any computing device that includes a processor, one or more memories in communication with the processor for receiving and storing the sketch image, one or more user interfaces that provide for entry of the input (sketch) for analysis by a plurality of analysis operations executable by the processor and a display of information relevant to the sketch, including instructions, tool selection options, analysis results, educational tips, and other information as will be described in detail below.

Referring to FIG. 2A, following the instructions provided in the assignment description 306, the student draws their attempted solution, sketch image 108, in sketch window 100. Sketch window 100 can include a sketch grid 102 and a sketch reference dot 104. In some assignments, successful completion of the assignment requires that the user draw the desired shape relative to sketch reference dot 104, which corresponds to assignment reference dot 310. In addition, in some assignments, the size of the desired shape is scaled according to the size of the assignment grid 312 relative to the size of the sketch grid 102.

A number of drawing tools in toolbar 350 shown in FIG. 2A can be made available to the user. A pencil tool 352 can be selected to activate a drawing tool that traces a line according to user motion within the sketch window 100. The pencil tool can also be used to create dots, dashes, and filled-in (shaded) regions. When selecting the pencil tool 352, a drop down can be activated to allow the user to select a line style. For example, a continuous line, a dashed line, a dotted line, or other line variations, e.g., line weight, can be selected to be drawn where the user presses their finger or stylus. An eraser tool 354 can be selected to delete selected portions of the drawn sketch. An undo tool 356 and redo tool 358 can be selected to undo or redo recent user actions. A zoom tool can 362 can be used to enlarge or reduce the image on the assignment window. A pan tool (not shown) may be provided to allow the user to move components of the sketched image 108 within to the sketch window 100, or to move the sketch window 100 relative to the sketched image 108.

Figure 2B:
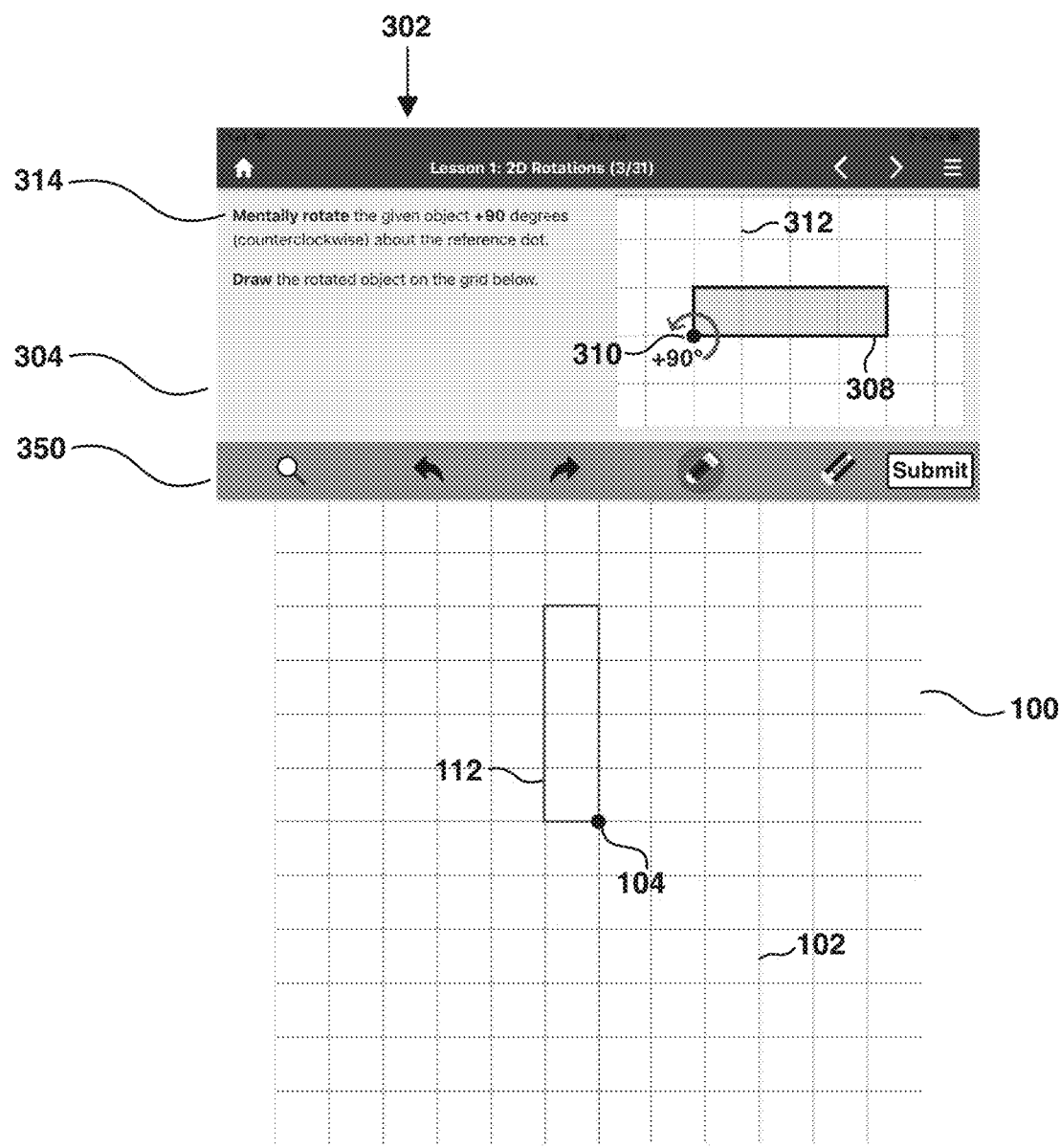
FIG. 2B shows a sketch solution for the assignment described in FIG. 2A.

As described above, the objective of the sample assignment is to mentally rotate the illustrated rectangle 308 90 degrees counterclockwise (indicated by arrow 320) about the reference dot 310, then to sketch the rotated object in the sketch window 100. In this example, the sketched solution is to be scaled in size from the assignment grid 312 to the size of the sketch grid 102. In addition, in this example, the sketched solution is to be positioned relative to reference dot 104 that corresponds to reference dot 310 in the assignment window. FIG. 2B illustrates a correct solution image 112, properly positioned relative to reference dot 104 on grid 102. If a user sketches an image that is similar to the solution 112, the sketch would be graded as correct. A teacher would typically allow some deviation of a student sketch from a designated solution. However, the amount of deviation between a student's sketch and a solution must be evaluated for proper grading.

As will be readily apparent, the rectangular shape of the assignment and solution shown in FIGS. 2B-2J is merely provided as an illustrative example. The sketch assignments and solutions can be any shape including circles, ellipses, open or closed polygons, diagonal lines, unconnected lines, and other shapes, in 2D or 3D. The sketch solution can also include an area, such as the area in a pie chart that needs to be filled in by the student.

Figure 2C:
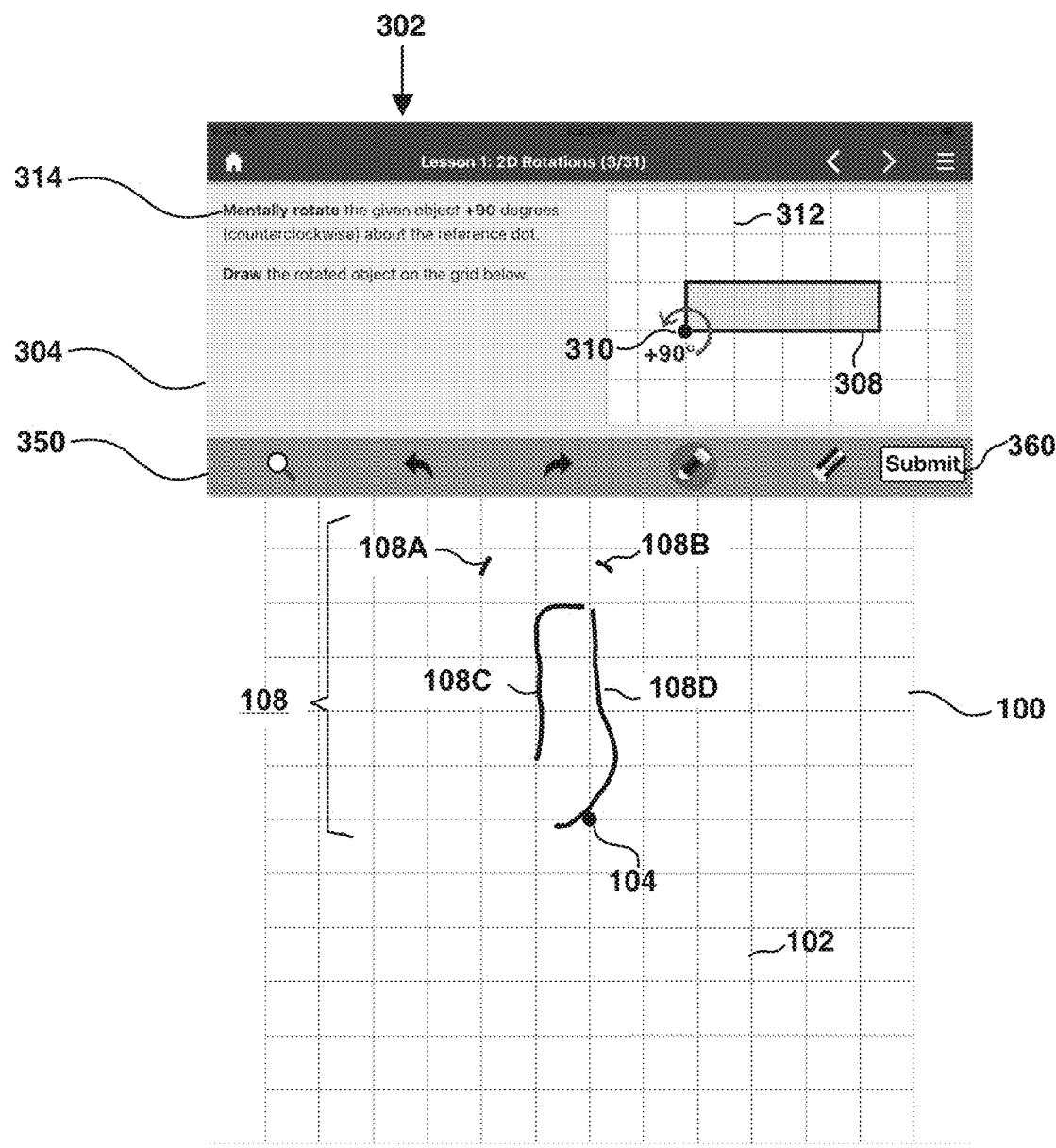
FIG. 2C shows a sketch image drawn by a user for the assignment described in FIG. 2A.

FIG. 2C shows an example of a sketch image 108 that may have been created by a student applying a fingertip or stylus to the touchscreen 302. The sketch image 108 may have multiple components, as represented by the multiple drawing segments 108A-108D that make up the sketch image 108. The sketch image 108 can be described as a set of pixels, set of marks, a set of image elements, as lines, and as areas. A "pixel" represents an image element, and a "set of pixels" can be used to represent an image and display an image. There are methods to represent, store, and display an image other than pixels, such as photographic film or a laser beam that is rapidly scanned to illuminate different parts of an image. Regardless of how an image is created or stored, it can be represented by a set of pixels. As used herein, "pixel" or "pixels" refer to image elements regardless of how the image was created or stored. If an image is not in the form of a set of pixels it can be converted to a set of pixels through scanning or other image processing technique. Accordingly, the methods and embodiments described herein that utilize pixels can also be applied to images that are not originally generated in pixel format by converting them to a set of pixels. Furthermore, as used herein, the term "image element," which may be used interchangeably with the term "image component," refers to some portion of an image, which can be a line, a shape, or any other feature that may be combined with other image elements to create an image. A sketch image can be stored digitally in a wide range of formats including bitmap, JPEG, SVG, DXF, TIFF, PNG, and other common image formats. The sketch image 108 can be drawn in a single color, in multiple colors, and at multiple shading levels.

Once the user has completed the sketch 108, they can submit it to be graded, for example, by pressing Submit button 360. Alternatively, the sketch may be graded after a pre-determined period of time, sketch activity, a pause in sketching, or other trigger that does not require the student to actively submit their sketch for grading. The image will then be stored in a device memory in communication with the device processor, thus allowing the device processor to execute one or a combination of the grading and teaching operations that are described below.

A grading algorithm is executed on the submitted image to determine whether the sketch should be graded as "correct." If the sketch is correct, a symbol such as a green check mark or thumbs-up emoji may be displayed. If the sketch is not correct, an indicator such as a red "X" 135 may be displayed within the sketch window 100 and an interface, such as a pop-up box 130 as shown in FIG. 1, can appear. The interface 130 can include a number of options for selection by the user, which may include a retry button 132 to allow the user to make another attempt at the sketch, a hint button 134 to provide a hint to the user, a peek button 136 to provide a peek at the solution, and a help button 138 to provide guidance in the form of text or graphical suggestions. The details of the hint and peek options will be described in more depth below.

In some embodiments, the approach for grading a sketch involves multiple steps. One step compares the submitted sketch image 108 in FIG. 2C to the solution image 112 shown in FIG. 2B, which is drawn precisely corresponding to the assignment description 314. Since the sketch image 108 may have been drawn freehand, it is likely to include minor deviations from the precise solution. An expert teacher would recognize that certain deviations are to be expected and may be acceptable, while other deviations would not be acceptable.

Figure 2D:
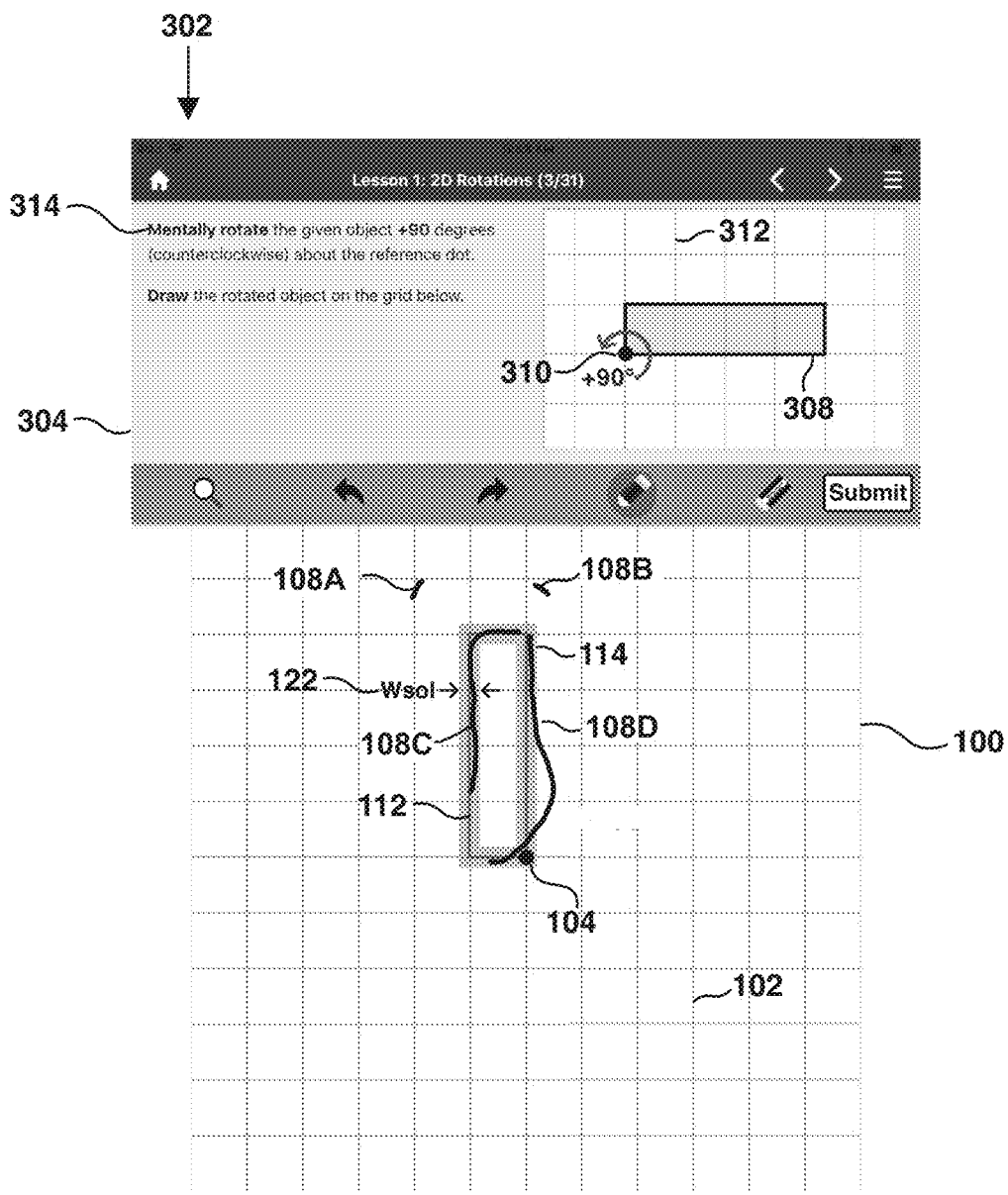
FIG. 2D shows a solution region for the assignment described in FIG. 2A.

One approach for determining if the sketch image is correct is to create a solution region 114 as shown in FIG. 2D. The solution region 114 represents an area within which a student's sketch lines will be considered acceptable. One possible solution region 114 would be an area that encompasses the solution sketch 112 with an additional margin for acceptable errors. The assignment author would define the shape of the solution region based upon their interpretation of what would be acceptable student sketches. Alternatively, the solution region 114 can be created directly from the solution image 112 by broadening the lines, for example, by using the computer image processing technique of dilation to dilate the shape of in the solution image 112. Dilation replaces each pixel that is part of an image with a shape consisting of a number of pixels. These dilation shapes, also referred to as "structural elements", can be squares, disks, or other shapes. The size of the structural elements will determine the extent to which the lines, shapes, and other marks in a solution image 112 will be expanded to define the solution region 114, which is illustrated in FIG. 2D as the shaded region (in blue) extending on either side of each line of the solution sketch 112, where each structural element of the solution region 114 having a width $w_{sol}$. The size of the structural elements may be designated by the diameter of a disk or the width of a square used in dilation. The width of solution dilation, $w_{sol}$, can be adjusted based upon what the author/grader considers to be an acceptable level of accuracy for the student's sketch. The dilation process is explained in more detail in the "imdilate" command which is described in the MATLAB® Image Processing Toolbox Reference Manual, Image Processing Toolbox User's Guide, and Image Processing Toolbox Release, all of which can be downloaded from the World Wide Web at mathworks.com. Each of these documents is incorporated herein by reference in its entirety to describe dilation methods as well as other image processing methods that are referenced herein. The solution image 112 can be drawn with thin lines, for example, as thin as a single pixel width, and then dilated to create the solution region 114. Alternatively, the solution image 112 could initially be drawn with thick lines, thus defining sufficient area to also serve as the solution region 114 without thickening or dilation. The solution image 112 could be drawn with lines so thick that it may be desirable to reduce the thickness to define the solution region 114. One way to reduce the thickness of a region is through the image process technique of erosion, which is also described in the aforementioned MATLAB® references. The end result is that the solution image consists of regions that encompass each connected element in the solution image.

Figure 2E:
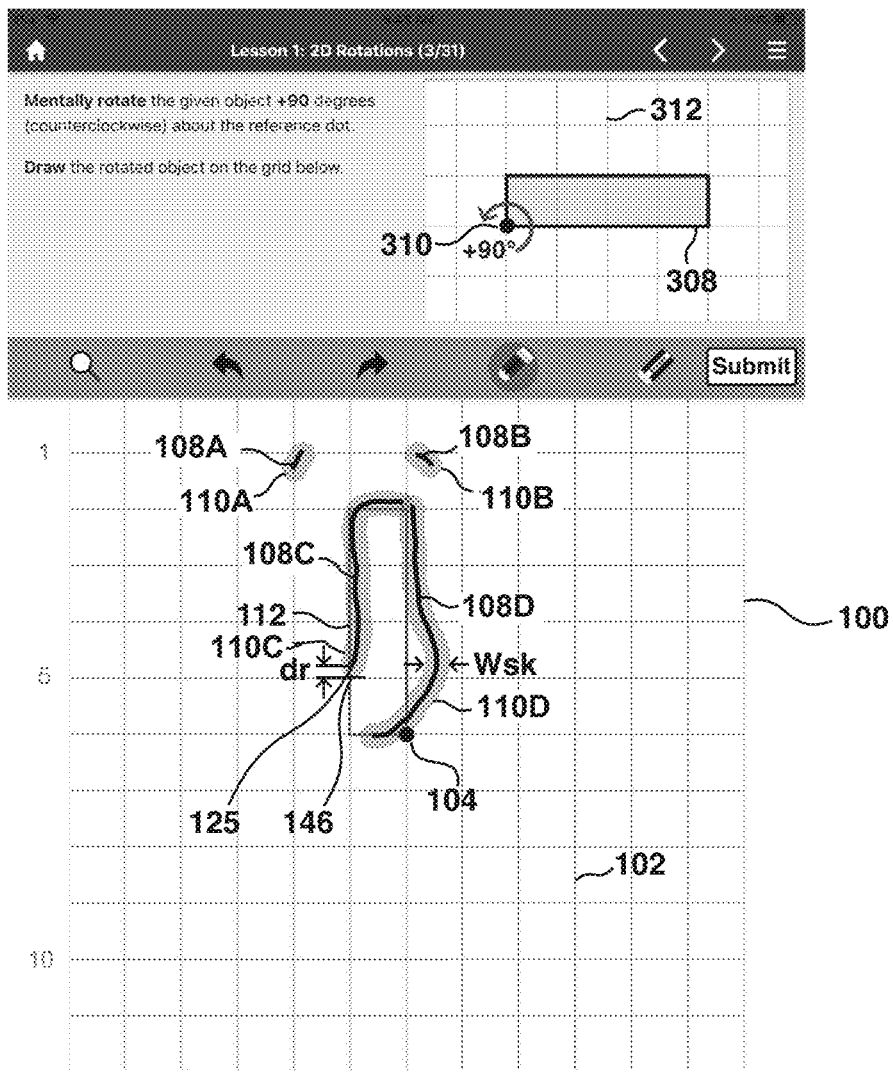
FIG. 2E shows a sketch region for the assignment described in FIG. 2A.

Another consideration to determine whether a sketch image is correct involves creating a sketch region 110 as shown in FIG. 2E. Since the sample sketch 108 includes multiple segments 108A-108B, multiple sketch regions, e.g., regions 110A-110C, may need to be defined. The sketch region(s) 110 can be created by modifying the sketch image 108, i.e., segments 108A-108D, by thickening, e.g., dilating, the lines of the segments of the sketch image 108 to the shaded areas 110 surrounding each segment of sketch image 108, each with width $w_{sk}$. It should be noted that the width $w_{sk}$ of a sketch region 110 may or may not be the same as the width of the solution region 114 shown in FIG. 2D. The sketch image 108 can be drawn with thin lines, e.g., a single pixel width, and then dilated to define the sketch region 110. Alternatively, the sketch image 108 could be drawn with thick lines, and therefore contain sufficient area to define the sketch region 110 without thickening or dilation. The sketch image 108 could be drawn with lines so thick that it is desirable to reduce the thickness to define the sketch region 110. As previously described, the thickness of a sketch region can be reduced using the image processing technique of erosion.

Sketch grading can be done using black and white images, where each image consists of a set of dark and light pixels at designated locations. If the sketch image and solution image are generated with color or grayscale, they can be converted to black and white (light and dark) for the purposes of implementing a grading algorithm. The methods described herein can also be applied directly to color and grayscale images by using thresholds to designate a pixel value that corresponds to marks in the image. In the description of black and white images herein, dark pixels are used to indicate segments where there are marks on an image, and light pixels are used to designate image segments without marks. The designation of dark and light pixels can be done solely for purposes of sketch grading, while the images presented to the user can be in any color.

When grading a sketch, an expert teacher may consider a number of factors, one of which is whether there are student marks in places where they should not be. Such stray marks can be designated as "additional image components." Another factor is whether the student has completely drawn the desired solution. Elements of a solution that a student did not draw can be designated as "missing image components."

Figure 2F:
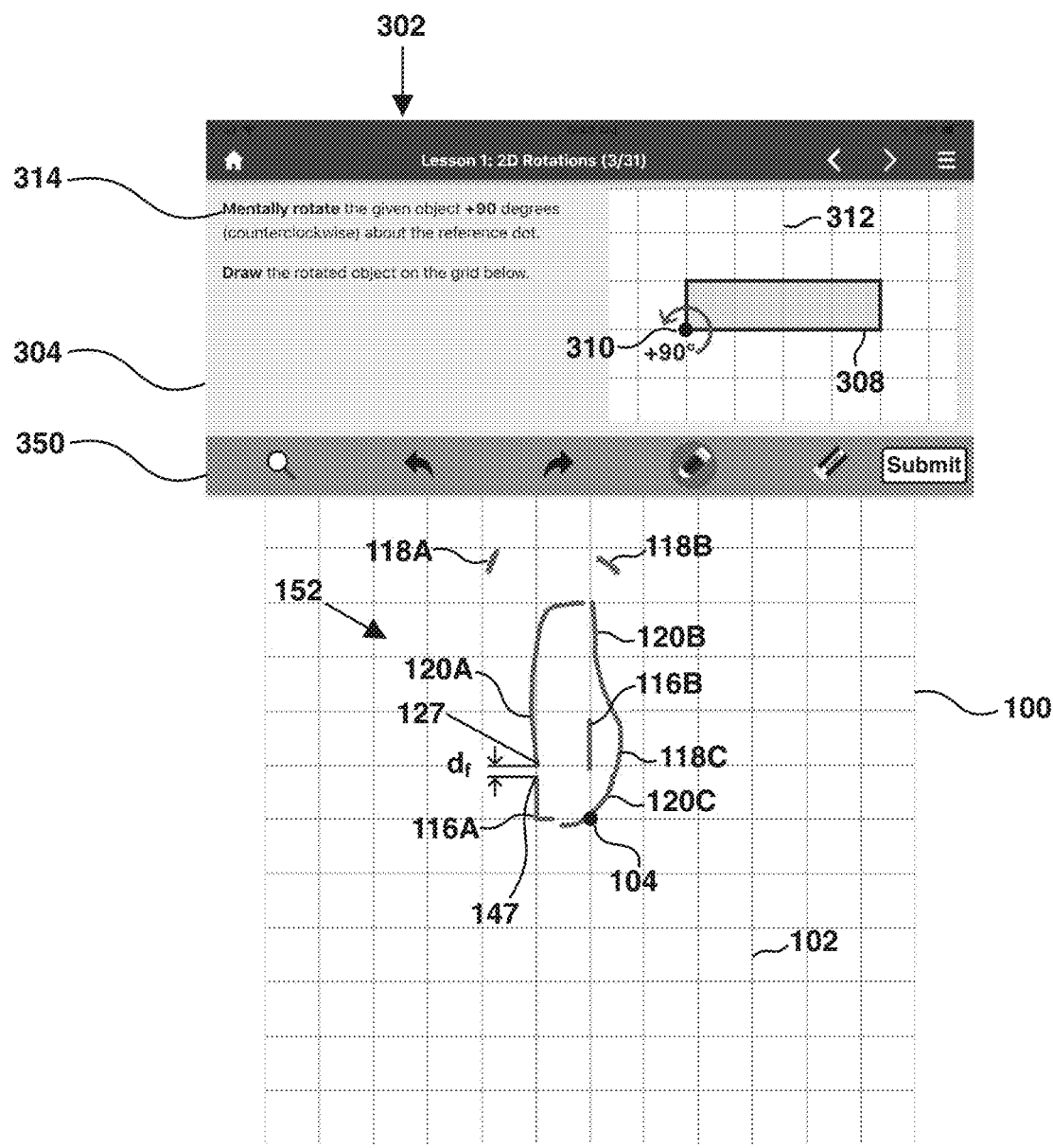
FIG. 2F shows a peek image for the assignment described in FIG. 2A.
Figure 8:
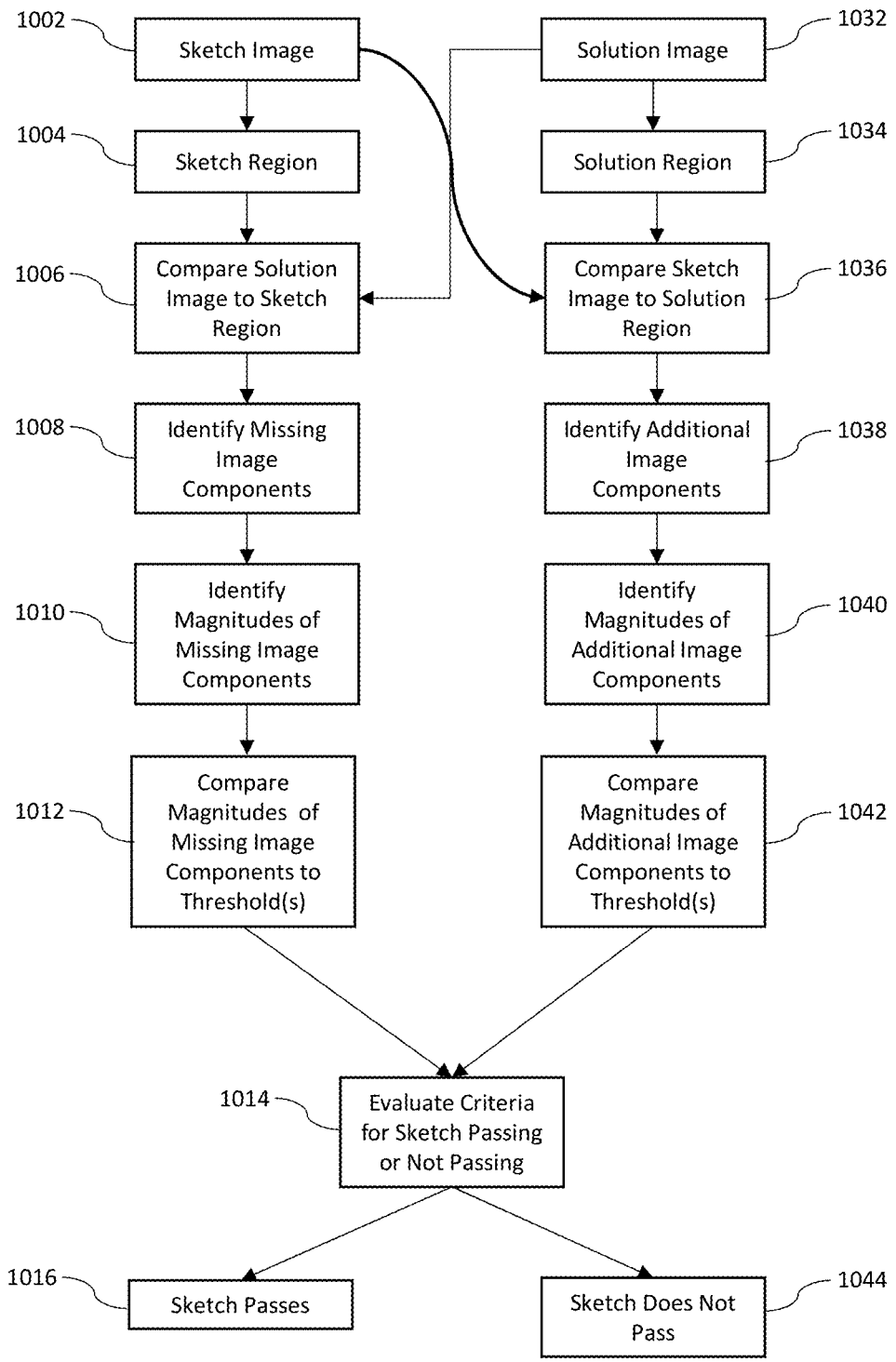
FIG. 8 is a flow chart illustrating a method for grading a sketch.

FIG. 8 is a flow chart illustrating the steps of an exemplary method of sketch grading according to an embodiment of the invention. An initial step 1002 is generation of a sketch image 108 by the student according to the instructions 314, such as shown in FIG. 2C. The solution image 112 is used in the sketch grading and is acquired in step 1032. The solution image 112 is typically generated by the assignment author during the process of creating the assignment. From the solution image 112, a solution region 114, such as shown in FIG. 2D, is generated in step 1034. The solution region 114 can be generated by dilating the solution image 112. The amount of dilation can be represented by $w_{sol}$. The sketch image 108 is compared to the solution region 114 in step 1036. The comparison in step 1036 can be seen in FIG. 2D, where the sketch image 108, consisting of segments 108A-108D, is shown on the same figure as the solution region 114. For images that consist of black and white pixels, where the black pixels correspond to marked areas, the comparison can be done by an image bitwise "AND" operation. If a pixel location is black in the both the sketch image 108 and the solution region 114, that pixel location can be designated as a sketched pixel that is within the solution region, thus indicating that this pixel has been drawn correctly and is part of a correct image component 120. Segments of correct image component 120 are shown in FIG. 2F as 120A, 120B, and 120C (shown as green lines to represent "correct"), corresponding to segments of the sketch image 108 that fell within the solution region 114 of FIG. 2D. As previously noted, since the sketch image 108 may have been drawn freehand, perfection is not expected, and lines that may stray slightly from the solution image 112 but still remain within the solution region 114 will nonetheless be considered acceptable. Step 1038 identifies sketched image components that are not part of the solution and are designated as additional image components 118. For black and white images, identification of additional image components can be done with a bitwise AND operation of the sketch image 108 with an inverted image of solution region 114. An inverted image can be created by flipping all the dark pixels to light and all the light pixels to dark. In the example of FIG. 2F, the additional image components of sketch image 108 that fall outside of the solution region 114 include segments 118A, 118B, and 118C (shown as red lines to signify "error"), which correspond to erroneous image components.

For a sketch to be graded as "correct," the completeness of the sketch should also be considered. A factor of completeness of a sketch can be indicated by the missing image components, which are elements of a solution that a student did not draw. Determining missing image components can be done through steps 1002, 1004, 1006, and 1008 in FIG. 8. As previously described, in step 1002, the user generates sketch image 108 as shown in FIG. 2C. From the sketch image 108, a sketch region 110, as shown in FIG. 2E, is generated in step 1004. In step 1006, the solution image 112 (shown as blue lines to signify "reference") is compared to the sketch region 110. Step 1008 identifies solution image components that are not part of the sketch region and designates them as missing image components 116, which correspond to required part(s) of the solution that have not been drawn. For images that can be represented by dark and light pixels, where the dark pixels indicate marked areas, identification of missing image components 116 can be done with a bitwise AND operation of the solution image 112 with the inverted sketch region 114. With this approach, pixels that are part of the solution image 112 but are not in the sketch region 110 are identified as missing image components 116. Referring to FIG. 2F, missing image component 116 consists of missing segments 116A and 116B (shown in blue), which correspond to erroneous image components.

Returning to FIG. 8, step 1010 identifies the magnitude of the missing image components 116, and step 1040 identifies the magnitude of the additional image components 118. There are a number of ways in which the magnitude of an image component can be quantified. It may be helpful to divide an image into distinct image segments, then identify the magnitude of each segment. Within a single image, a set of contiguous segments can be identified. One method of identifying contiguous or connected segments within an image can be done using the MATLAB® commands "bwconncomp" or "bwlabel." These approaches identify sets of pixels in an image in which all pixels in a set are adjacent to at least one other pixel in the set. In image processing and image recognition, pixel connectivity is the way in which pixels in 2-dimensional images relate to their neighbors. Connectivity can be defined in a number of ways: "4-connected" considers a pixel being present directly in a row above or below, or in a column directly to the side, while "8-connected" also considers a pixel being diagonal as connected, as explained in the MATLAB® commands "bwconncomp." In a case where a pen may skip pixels, it can be desirable to dilate an image before calculating connectedness to fill in the skips. In a case where a very broad pen is used it may be desirable to erode an image before calculating connectedness to remove unintended connectedness. Methods for eroding or dilating an image are described in the MATLAB® Image Processing Toolbox with commands "imerode" and "imdilate." As used herein, "contiguous image segments" and "contiguous image elements" are used interchangeably with "connected image segments" and "connected image elements." These contiguous segments are sometimes referred to as "blobs" in the image processing community. Some references to blobs in image processing refer to other image characteristics, however, for purposes of the present description, the term "blob" refers to an image segment that is contiguously connected. Both steps 1010 and 1040 can be implemented by first identifying contiguous segments within the missing image component and the additional image component, respectively. Once the contiguous segments are identified, the magnitude of each contiguous segment can be determined. For purposes of this description, reference number 116 corresponds to the complete missing image component, while the numbers 116A and 116B represent different contiguous segments that collectively make up missing image component 116. In a similar fashion, reference number 118 represents the complete additional image component, and the numbers 118A, 118B and 118C represent different contiguous segments that collectively make up additional image component 118. Later in this description, a correct image component 120 will be described, where the segment numbers 120A, 120B, and 120C represent different contiguous segments that collectively make up correct image component 120.

Figure 5:
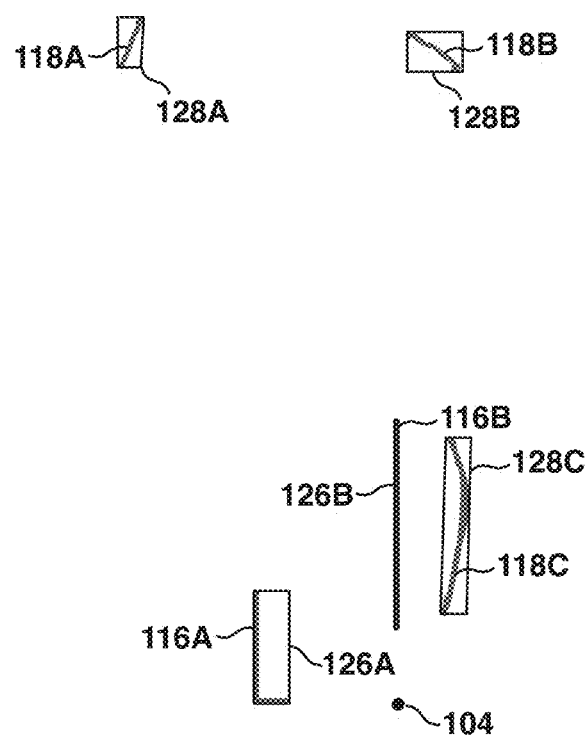
FIG. 5 shows bounding boxes on various image components.

The magnitude of image components can be estimated in a number of ways. In some embodiments, the inventive approach employs the MATLAB® command "regionprops." This includes the size of a bounding box, the length of the longest side of a bounding box, the diagonal of a bounding box, the number of pixels, the area covered by the segment, the diameter of a bounding circle, the major axis of the ellipse that has the same normalized second central moments as the segment, the perimeter of the segment, or other methods. Any of these methods can be used to perform steps 1010 and 1040 in the flowchart in FIG. 8. To illustrate the use of bounding boxes, FIG. 5 shows sample bounding boxes 128A, 128B and 128C for additional image components 118A, 118B and 118C (shown in red to represent "error") from FIG. 2F. The magnitude of the additional image components can be characterized by their corresponding bounding boxes. Similarly, the magnitude of the missing image components 116A and 116B (shown in blue) can be characterized by bounding boxes 126A and 126B. The magnitude of each bounding box can, in turn, be characterized as previously described.

An expert teacher would typically allow a sketch to be graded as correct only if there are small unintentional variations from the correct sketch. The intention of the student is relevant because it is an indication of the student's understanding of the assignment and how to execute it. An unintentional error may be acceptable, because it does not indicate a conceptual error by the student. However, an intentional error is likely to be graded more strictly because a teacher would want the student to be aware of a conceptual error that they made. Small variations within the sketch solution are considered as appropriate if they are within the solution region 110, and these variations are not considered as additional image components 118. However, sometimes a user may inadvertently create a small mark at an arbitrary location in the sketch window 100. An expert teacher would recognize this as an inadvertent sketch component, and still grade the sketch as correct. Such inadvertent marks may be due to the palm of the hand hitting a touchscreen, or other inadvertent motion that generates a mark. This approach of an expert teacher can be incorporated into the sketch grading algorithm described herein. One method of identifying a mark as inadvertent is to determine the magnitude of the contiguous segment in an image.

Step 1012 in FIG. 8 compares the magnitudes of the contiguous segments of missing image components, which can be referred to as "missing blobs," to a designated threshold or thresholds. One approach is to compare the maximum magnitude of the missing blobs to a first threshold. Another approach is to compare the sum of magnitudes of the missing blobs to a different threshold. A combination of these approaches may be used, or just one of the approaches can be used.

In a similar fashion, step 1042 in FIG. 8 compares the magnitude of the contiguous segments of additional image components, which can be referred to as "additional blobs," to a designated threshold or thresholds. One approach is to compare the maximum magnitude of the additional blobs to a second threshold. Another approach is to compare the sum of the magnitudes of the additional blobs to a different threshold. One or a combination of these approaches may be used.

In step 1014 in FIG. 8, the criteria for the sketch passing are evaluated. If both the comparison in step 1012 and step 1042 pass, which can occur when the magnitude of additional pixels is below a threshold and the magnitude of missing pixels are also below another threshold, then the sketch will be graded as correct and the student's device will display a symbol indicating the assignment was correctly completed as previously described. On the other hand, if either of these tests is not met, then the sketch can be graded as incorrect and a corresponding alert will be displayed. Thresholds may be pre-determined or may be adjusted based on the size of the user interface, the accuracy of a student's sketches in prior assignments, or other factors that affect the accuracy at which a student is sketching.

The threshold levels can be selected to set a balance between leniency and strictness in grading. For assignments that utilize the grid 102, an example of an appropriate threshold for the maximum magnitude of a blob would not exceed half the length of a single grid square. If a blob is larger than half a grid length, it can be considered more likely than not that the intention of the student was to extend the line into that grid.

As described above, the grading of a sketch can depend on both the magnitude of the blobs in the sketch, and the location of these blobs. For example, a small blob that is part of the sketch image 108 that is within the solution region 114 is not considered to be an additional image component and thus is not considered an erroneous image component. Indeed, this same small blob may aid in the sketch getting a passing grade because it reduces the magnitude of the missing image component. Accordingly, the approach described herein is different than an image processing step of removing noise in an image by removing all small blobs through the image. Such noise reduction approach does not distinguish between intentional and unintentional marks and could remove marks that may prevent a sketch from being graded correctly.

Figure 9:
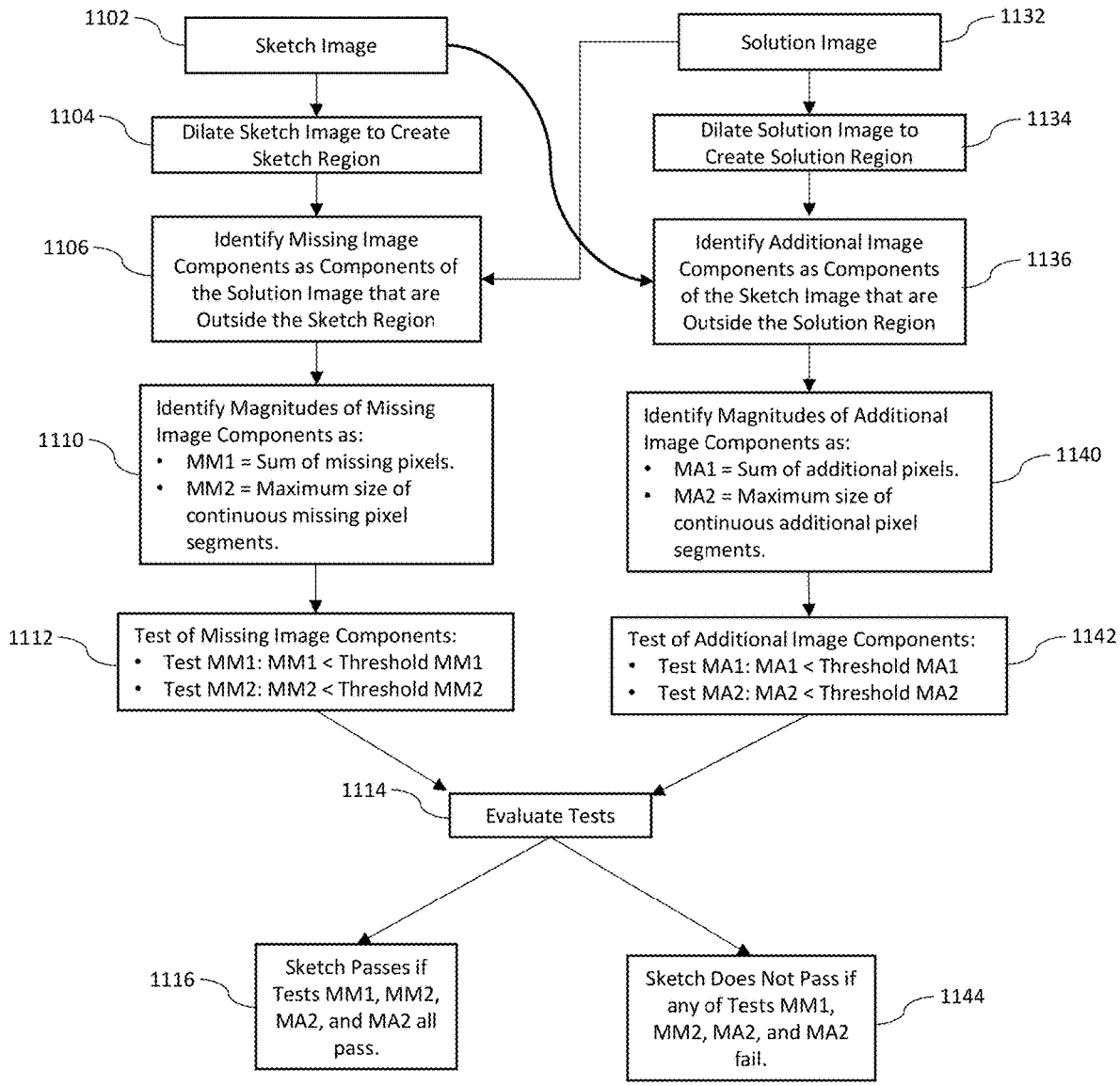
FIG. 9 is a flow chart illustrating a method for grading a sketch with tests.

FIG. 9 is a flow chart illustrating the steps of another aspect of the inventive approach for sketch grading. The left side of the flow chart evaluates missing image component 116 in steps 1102, 1104, 1106, 1110, and 1112. In this sequence of steps, a sketch image 108 is created by the student in step 1102. A sketch region 110 is generated in step 1104 by dilating the sketch image 108. In step 1106, the missing image component 116 is identified as the component of the solution image 112 that is outside the sketch region, as shown in FIG. 2E. Step 1110 identifies the magnitude of the missing image component 116. The approach used in step 1110 is to define two parameters to represent the magnitude of the missing image component 116, MM1 and MM2. The sum all of the missing pixels in missing component 116 is set to the Parameter MM1. The maximum size of the contiguous missing pixel segments, e.g., segments 116A and 116B, in missing component 116 is set to Parameter MM2. The magnitude of a contiguous image component can be estimated in a variety of ways, some of which are described in the MATLAB® command "regionprops." One common way is to define a bounding box around each contiguous missing pixel segment in missing component 116, e.g., 116A and 116B in FIG. 2F. The magnitude can be represented by the largest of the width or height, or by the diagonal of the bounding box. Step 1112 tests the missing image component, where test MM1 evaluates whether Parameter MM1 is less than a Threshold MM1 and test MM2 evaluates whether Parameter MM2 is less than a Threshold MM2.

The right side of the flow chart in FIG. 9 evaluates additional image component 118, e.g., segments 118A-118C, in steps 1132, 1134, 1136, 1140, and 1142. In these steps, a solution image 112 is created by the author of the assignment in step 1132. A solution region 114 is created in step 1134 by dilating or otherwise broadening the solution image 112. In step 1136, the additional image component 118 is identified as the portions of the sketch image 108 that are outside the sketch region 114, which is shown in FIG. 2D. Step 1140 identifies the magnitude of the additional image component 118, which includes segments 118A-118C. The approach used in step 1140 is to define two parameters to represent the magnitude of the additional image component 118, MA1 and MA2. The sum all of the additional pixels in 118, i.e., segments 118A-118C, is set as the Parameter MA1. The maximum size of contiguous additional pixel segments in 118 is set as Parameter MA2. The magnitude of image components can be estimated in a number of ways, some of which are described in the MATLAB® command "regionprops." One common approach is to define a bounding box around each contiguous missing pixel segment in 118, e.g., 118A, 118B and 118C in FIG. 2F. The magnitude can be represented by the largest of the width or height, or by the diagonal of the bounding box. Step 1142 tests the additional image component in which Test MA1 evaluates whether Parameter MA1 is less than a Threshold MA1 and Test MA2 evaluates whether Parameter MA2 is less than a Threshold MA2.

Step 1114 in FIG. 9 evaluates the different possible outcomes of tests MM1, MM2, MA1, and MA2. If all four tests pass, the sketch is graded as "correct" and it passes in step 1116. However, if any of the four tests does not pass, the sketch is graded as "incorrect" and it does not pass in step 1144.

Figure 10:
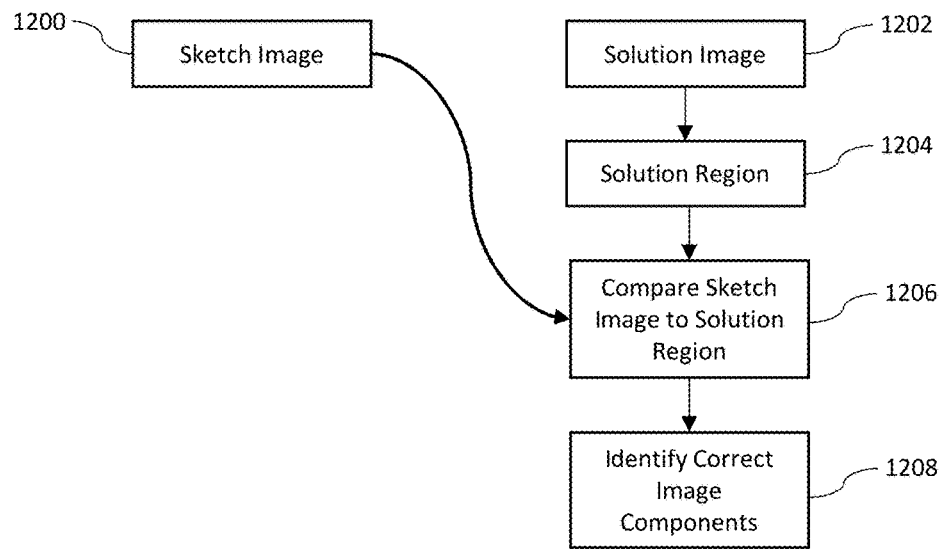
FIG. 10 is a flow chart showing the generation of a correct image component

In addition to a missing image component 116 and additional image component 118, another image component can be used when providing feedback to the student is a "correct image component" 120, the process flow for which is provided in FIG. 10. In step 1200, a sketch image 108 is created by a student. In step 1202, a solution image 112 (e.g., FIG. 2B) is created by the author of the assignment. In step 1204, a solution region 114, as shown in FIG. 2D, is created. In step 1206, the sketch image 108 is compared to the solution region 114. In step 1208, a correct image component 120 is determined. One method to implement step 1208 is to identify the component of the sketch image 108 that is inside the solution region 114. Examples segments of a correct image component 120 are shown in FIG. 2F as image segments 120A, 120B, and 120C (shown in green to signify "correct").

Figure 11:
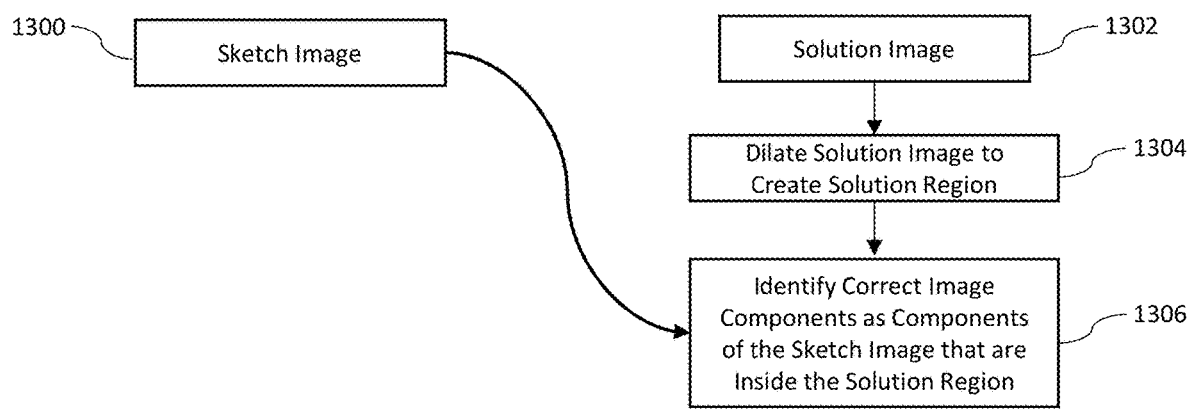
FIG. 11 is a flow chart showing the generation of a correct image component using dilation of the solution image.

FIG. 11 illustrates the process flow for identifying a correct image component 120. In step 1300, a sketch image 108 is created by a student. In step 1302, a solution image 112 is created by the author of the assignment. In step 1304, the solution region 114 is created by dilating or otherwise broadening a solution image 112. In step 1306, a correct image component 120 is identified as the components of the sketch image 108 that are inside the solution region 114. This identification can be done through a Boolean "AND" operation to identify pixels that are part of both the sketch image 108 and the solution region 120. Examples of the segments of a correct image component 120 are shown in FIG. 2F as 120A, 120B, and 120C.

Feedback to the student is an important aspect to the educational effectiveness of the inventive approach. If a student gets stuck and is having difficulty understanding the assignment and/or their errors, it is important to be able to provide them with guidance so that they can continue to work on the assignments. On the other hand, it is also important to not give too much help since learning tends to be more effective when the student figures out the problem on their own. In the field of pedagogy, this is sometimes referred to as "effective struggle" and is an indication of student persistence. Accordingly, it is important to be able to provide help to a student who is having difficulty with an assignment, but not provide them with the complete solution to the assignment.

One method for providing help to a student whose sketch has been graded as incorrect is by providing students different options for proceeding, such as those shown in FIG. 1. As previously described, using pop-up box 130, which is automatically presented along with an alert indicating an incorrect result, the user can retry the assignment by selecting button 132, receive a hint by selecting button 134, or peek at the solution by selecting button 136. The student can be encouraged to retry the assignment without use of a hint or peek through grade incentives or gamification. For example, a student may receive three points for solving a problem without using "Hint" or "Peek", two points for solving a problem with aid of a hint, and one point for solving a problem after a peek at the solution. However, in some cases, a student will need some help, and the purpose of the hint is to provide a measured amount of help without providing the complete solution. Because the sketching assignments described herein can be retried multiple times until a student gets them correct, this learning approach can encourage and develop persistence.

Figure 2G:
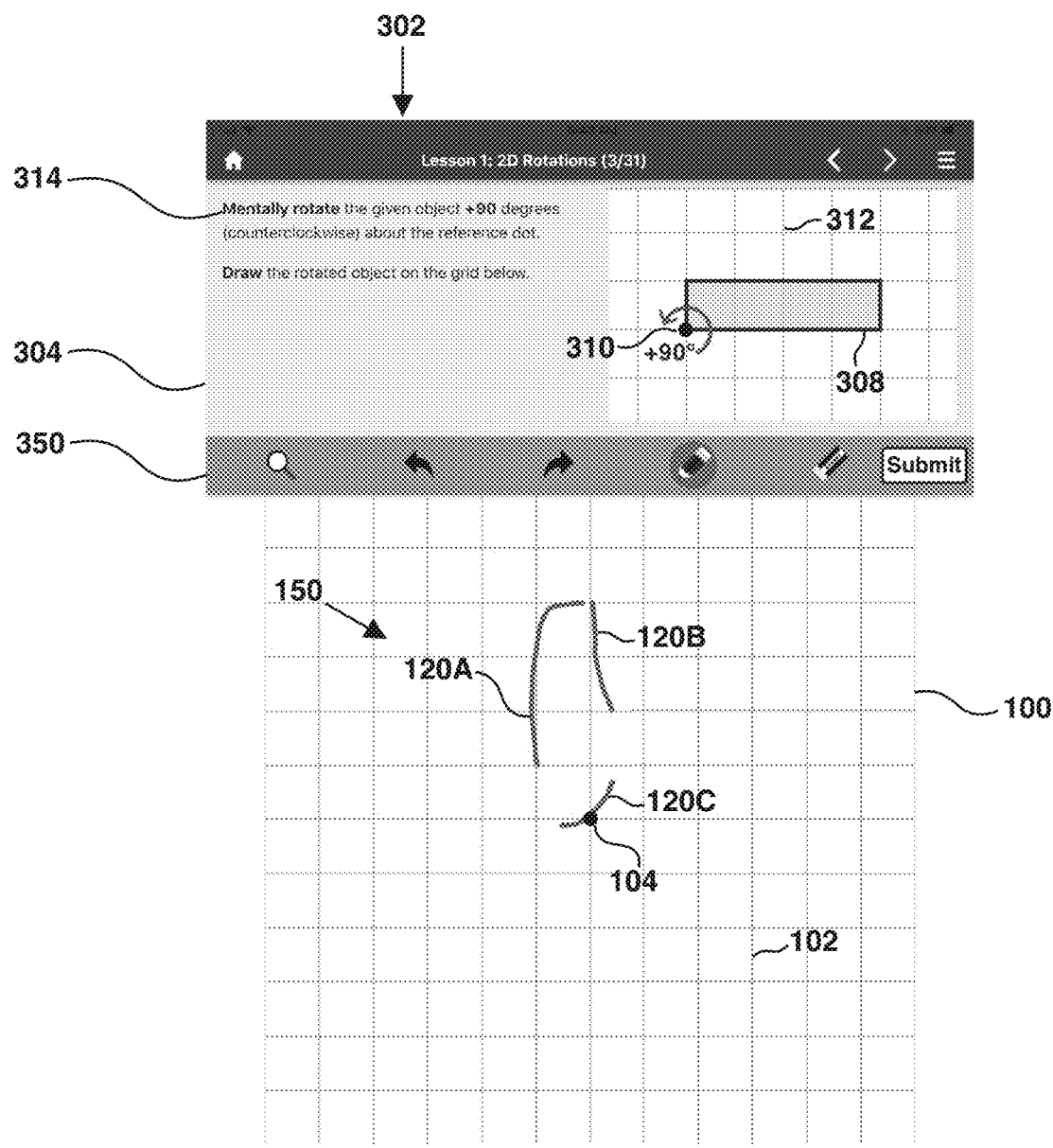
FIG. 2G shows hint image for the assignment described in FIG. 2A.

One scheme for providing feedback to the student is described with reference to the flow chart in FIG. 12 and shown graphically in FIGS. 2F and 2G. In flow chart of FIG. 12, the process starts at step 1400 with a sketch that has been graded as "incorrect" using the methods previously described. The student is presented with three options: step 1402, which is to retry the assignment without additional help by selecting button 132 in pop-up box 130; step 1404, which is to receive a hint by selecting button 134; and step 1406, which is receive more help which includes a peek at the solution, accessed by selecting button 136. If the student selects the "retry" option 1402, they do not receive help and can proceed with another attempt at a sketch. If a student selects the "hint" option, subsets of solutions can be selected. If the student selects the "peek" option 1406, they can be provided with a wide range of helpful information such as which components were erroneously missing from the prior attempt, which additional image components were erroneously included in the prior attempt, etc., in step 1410. For example, they can be shown the complete sketch solution 112 shown in FIG. 2B. Alternatively, or in addition, with the peek option 1406, the graded sketch components can be presented to the student, indicating which parts of the sketch they did correctly and which parts were done incorrectly. FIG. 2F provides an example of how graded sketch components could be presented to the student, where peek feedback image 152 displays in the same figure a correct image component 120, a missing image component 116 and an additional image component 118. Color coding can be used to designate the elements of the peek feedback image 152, where, for example, the correct image component 120 is shown in green (to signify what was "correct" in the student's sketch), the missing image component 116 in blue (to represent the "reference"), and the additional image component 118 in red (to signify "errors"). Step 1410 can use alternate colors, and different visual characteristics, such as dashed, hashed, or dotted lines, can be used to indicate the grade sketch components. Different types of image components can be presented one at a time, in an animation, i.e., a sequence, and may include a figure that simply shows the sketch solution. An image morphing video can be used to show, for example, the correct image component 120 of the student's sketch morphing into the solution image 112. The MATLAB® Image Processing Toolbox can aid in generation of such a morphing video. Alternatively, some portions of a peek feedback image 152 can dissolve and appear over time. For example, the additional image components 118 could dissolve, and then the correct image component 120 could morph into the solution image 112.

Figure 12:
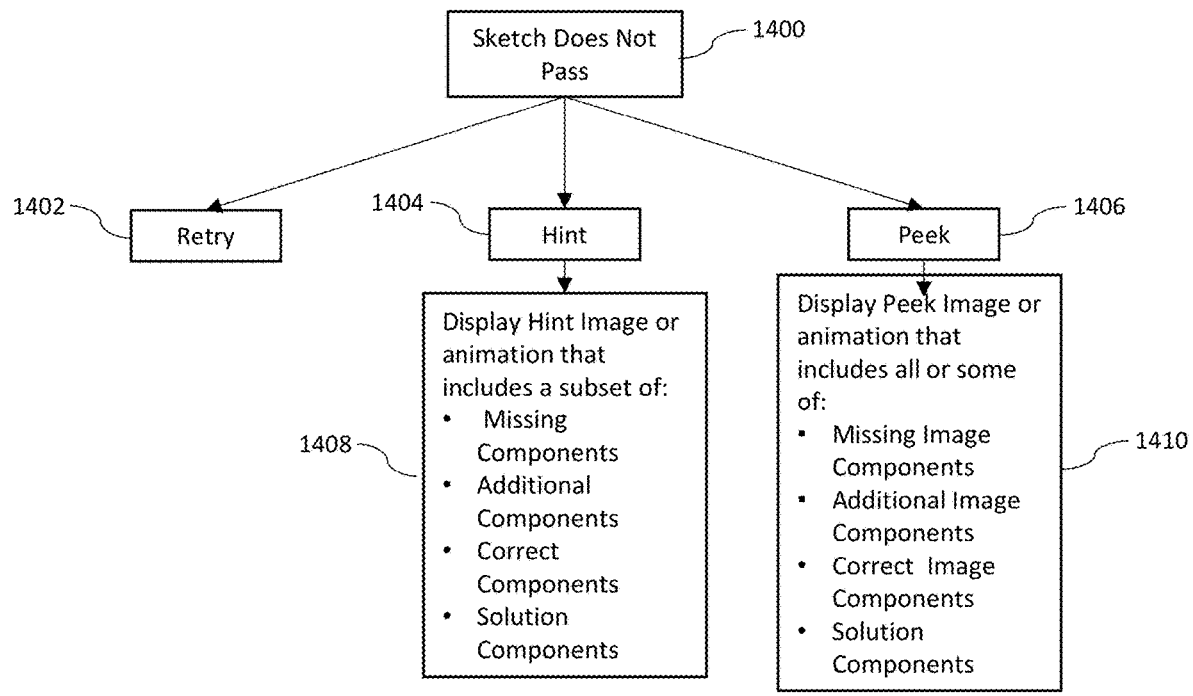
FIG. 12 is a flow chart showing feedback to the student

Step 1408 in FIG. 12 occurs when the student selects the hint option 1404. The challenge is to help the student without giving away too much of the solution. Accordingly, only a subset of all the graded sketch components will be presented to the student as a hint. One approach is to present to the student the correct image component 120, which lets the student know which part(s) of the sketch they submitted was graded as correct. FIG. 2G provides one example of a hint feedback image 150 that displays graded sketch components to the student, showing segments 120A, 120B, and 120C of the correct image component 120. Using this approach, the hint contains actual sketch components that the student drew. A student who sees the hint can continue to sketch and can obtain additional hints each time they resubmit their sketch for grading. Each additional hint can be based on the most recently submitted sketch, allowing the student to gradually acquire more information about the solution. A benefit of this approach is that the student is forced to work through the process to receive the hint information, and the hint is customized to the work that the student has already submitted.

Figure 2H:
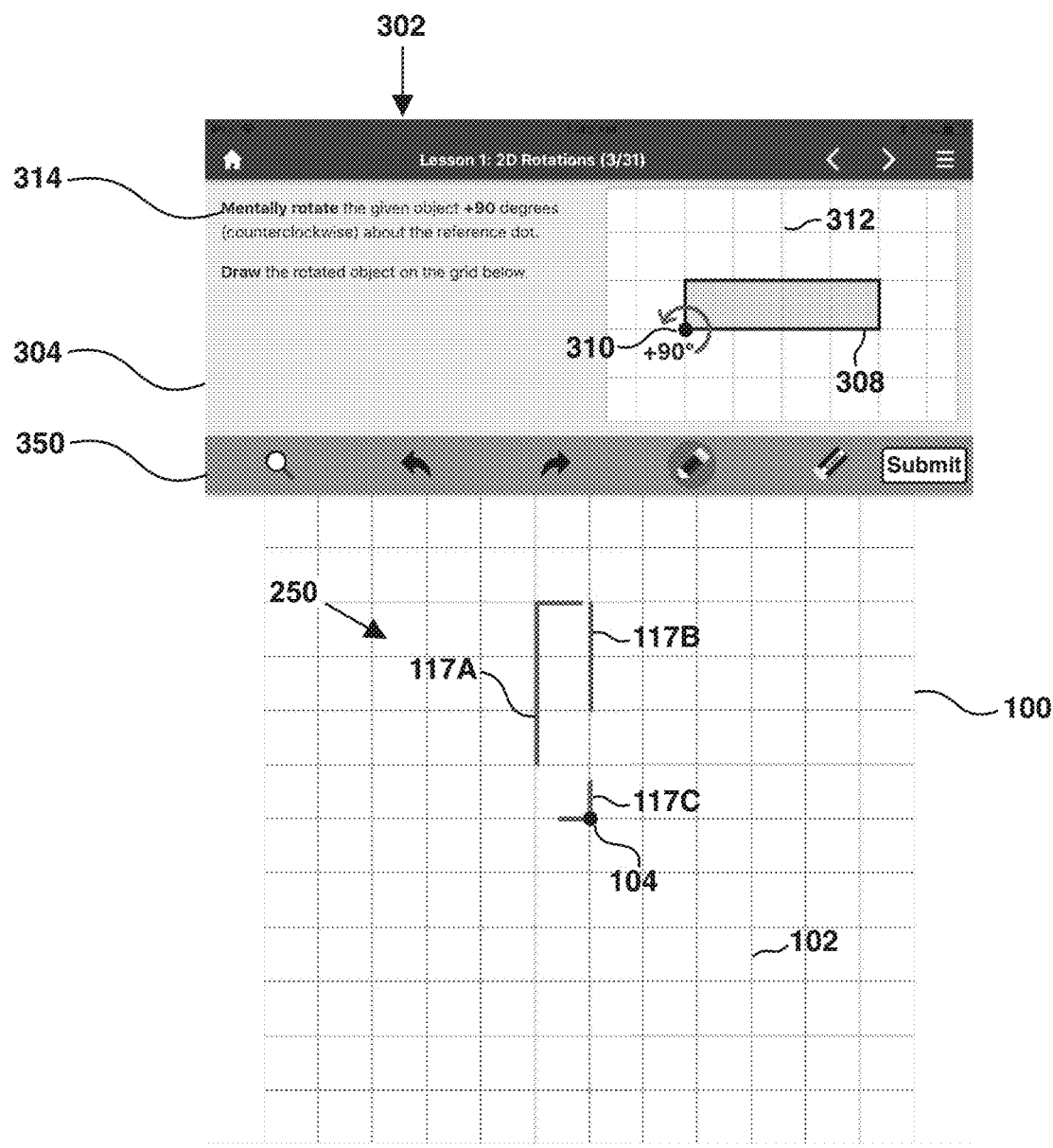
FIG. 2H shows a hint image with credited components of a solution image for the assignment described in FIG. 2A.

Hint feedback of step 1408 can include a subset of a correct image component 120, a missing image component 116 and an additional image component 118. For example, it may be clearer to the student if the hint image that is displayed is based upon the solution image 112. For example, a student's sketch 108 may include uneven variations for the solution image 112, making it difficult for the student to understand, even when it is their sketch. In this circumstance, it could be clearer to display the portion of the solution image 112 that corresponds to the correct image component 120 that the student drew. This is referred to as a "credited component of a solution image" because the student has received credit for that portion of the solution. FIG. 2H provides an example of a hint feedback image 250 with segments 117A, 117B, and 117C of the credited component of a solution image 117. Here, the lines in 117A, 117B, and 117C are portions of the rectangle in the solution image 112 that correspond to the correctly-drawn parts of the student's sketch 108. However, unlike the original sketch 108, the lines of 117 in this example are straight and the corners are sharp as in the solution image 112, making the image easier to interpret.

Figure 13:
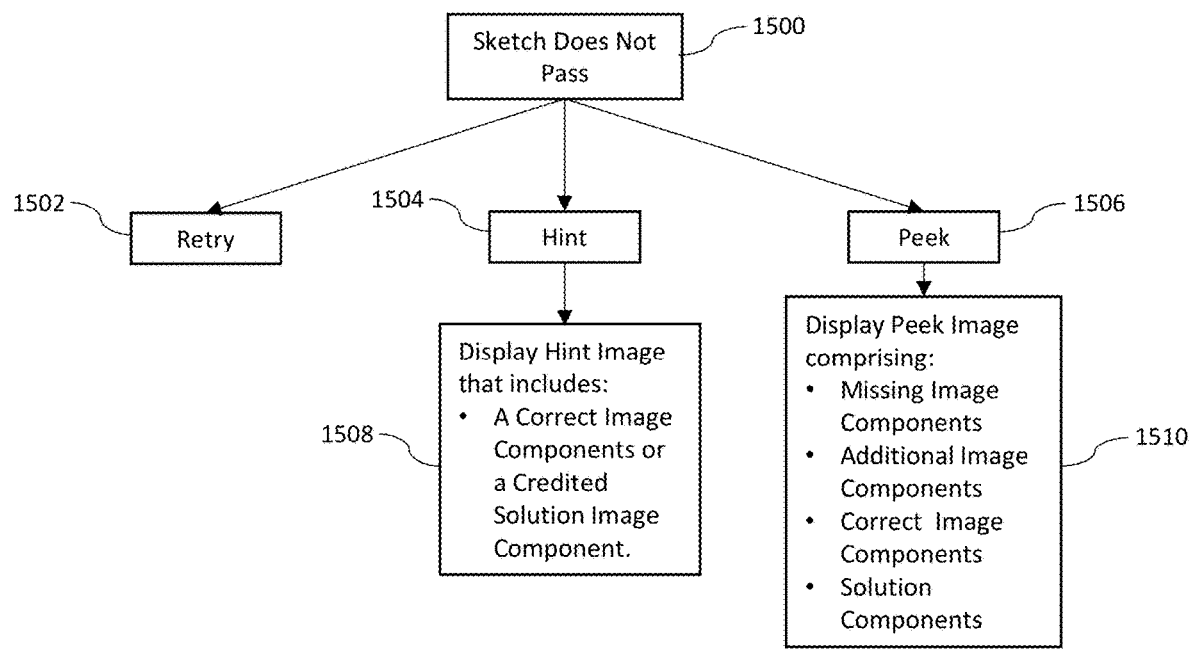
FIG. 13 is a flow chart showing feedback to the student where the hint is based primarily on the correct image component or credited solution image component.

Another method of providing feedback to the student is described with reference to the flow chart in FIG. 13. The process begins with a sketch that has been graded as incorrect. Steps 1500, 1502, 1504, and 1506 are the same as steps 1400, 1402, 1404, and 1406 of FIG. 12. However, if the student chooses to receive a hint, step 1508 specifically presents a hint to the student using correct image components such as the correct image components segments 120A, 120B and 120C in FIG. 2G. Alternatively, step 1508 could be implemented by displaying a hint to the students using credited solution image components such as segments 117A, 117B, and 117C of credited component of a solution image 117 in FIG. 2H. Described below is a method for extending the credited solution image components. With this approach, a hint can be presented using "extended credited image components" of a solution image, for example, segments 160A and 160C in FIG. 3D. A peek feedback image can be presented to the student in step 1510 in a manner similar to step 1410 in FIG. 12.

Figure 14:
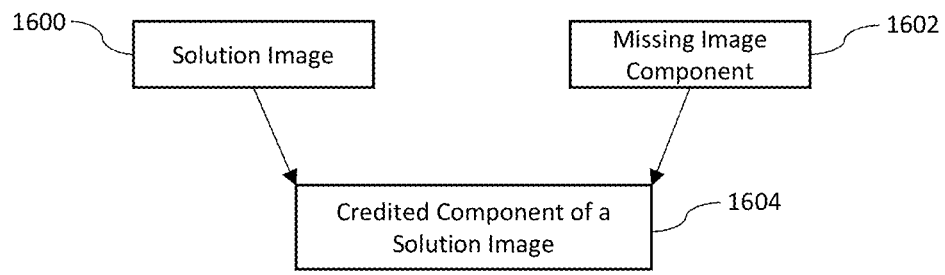
FIG. 14 is a flow chart that shows a method for generating a credited component of a solution image.

Steps for generating a credited component of solution image are shown in the flow chart in FIG. 14. In step 1600, a solution image 112 is acquired, and in step 1602, a missing image component 116 is acquired. Both steps 1600 and 1602 can be implemented using methods described above. In step 1604, a credited component of a solution image 117 is created, e.g., segments 117A, 117B, and 117C of FIG. 2H. One method to implement step 1604 is to subtract the missing image component 116 from the solution image 112. This image subtraction can be done through an "AND" pixel operation of a solution image 112 with an inverted missing image component 116. The resulting credited component of a solution image can be part of a hint feedback image 250 and part of a peek feedback image.

When using image regions, there can be discrepancies between how an expert teacher might grade and how the algorithms described above would grade aspects of a sketch. When step 1106 in FIG. 9 is used to identify missing image components 116, the width $w_{sk}$ of sketch region 110 and the geometries of the sketch image 108 and solution image 112 can result in a gap $d_r$. For example, referring to FIG. 2E, a gap $d_r$ exists between the lower end 125 of sketch image 108C segment and the lower end 146 of sketch region 110C. One consequence of this gap is that it impacts the credited component of a solution image 117. Specifically, solution image segment 117A, shown in FIG. 2H, is longer by a distance equal to gap $d_r$ than is the actual corresponding sketch segment 108C, which does not quite reach the $5^{th}$ horizontal grid line in the example shown in FIG. 2E. (In FIG. 2E, the horizontal grid lines are numbered for reference.) Thus, the credited component of a solution image 117 would be determined to be larger as a result of the additional separation represented by gap $d_r$, which, in turn can result in gaps in the feedback images provided to the student. For example, in FIG. 2F, there is a gap $d_f$ in the feedback image between the lower end 127 of correct image component 120A and upper end 147 of missing image component 116A. The gap $d_f$ in feedback image 152 can make the feedback less clear, and also could apply different credit to a student than an expert teacher would give. For example, when an expert teacher is manually grading an assignment such as drawn in FIG. 2E, the teacher may extend a missing image component beyond gap $d_r$ to be closer to the end 125 of the sketch image line 108.

Figure 15:
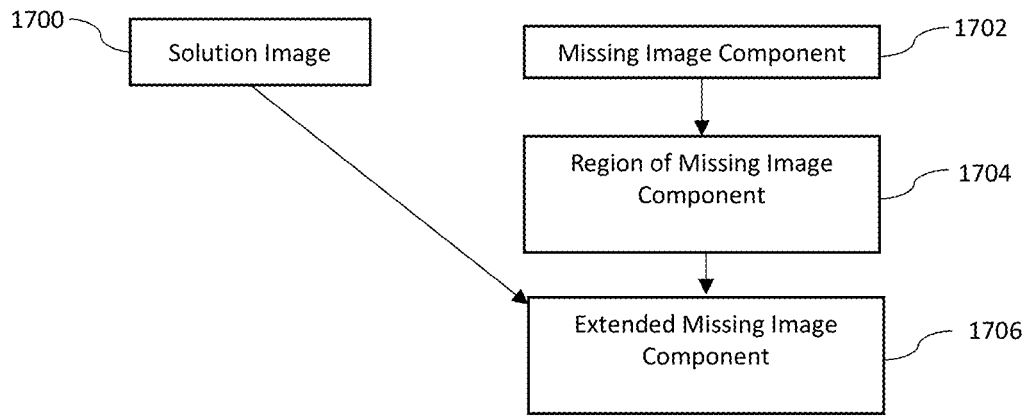
FIG. 15 is a flow chart that shows a method for extending missing image components.
Figure 16:
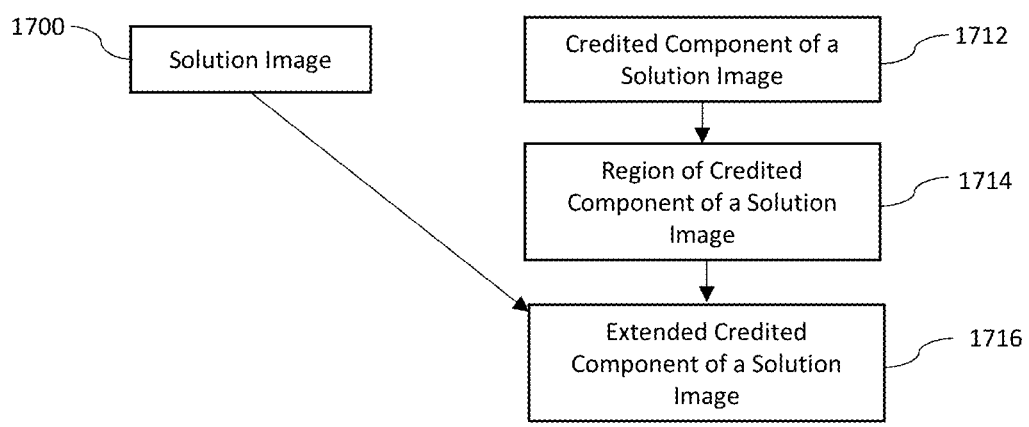
FIG. 16 is a flow chart that shows a method for extending a credited component of a solution image.

Methods to reduce or eliminate the effect of gaps, such as gap $d_r$ and gap $d_f$ in the hint feedback image 150 and peek feedback image 152, as well as elsewhere, are described in flow charts in FIGS. 15 and 16, and shown graphically in FIGS. 3A-3D. In FIG. 15, step 1702 starts with a missing image component 116, which, in the example of FIG. 3A, includes missing image segments 116A and 116B. In step 1704, the missing image component 116 is expanded into a region of missing image component 154 (shown as blue shading), examples of which are shown in FIG. 3A as the component 116A is expanded into region 154A, and component 116B is expanded into region 154B. Creation of region 154 can be done by thickening lines of 116, by dilating the image 116, or by other methods as are known. Step 1706 in FIG. 15 utilizes a region of missing image component 154 along with a solution image 112, which is acquired in step 1700. In step 1706, one or more extended missing image components are created. This extension can be implemented by finding the components of the solution image 112 that are contained in a region of missing image component 154. One method to finding this extension is to perform a pixel "AND" operation between the solution image 112 and a region of missing image component 154. The different segments of a missing image can be extended one component at a time or all components together with a single dilation and pixel "AND" operation. FIG. 3B shows the extended missing image components 156A and 156B corresponding to original missing image components 116A and 116B. As shown, the extended missing image components 156A and 156B extend to the corresponding edges of the regions 154A and 154B. The extended missing image components 156 can be used in hint image 150 or in a peek image 252. Using an extended missing image component 156 can reduce or eliminate gaps to increase feedback clarity to the student. This approach can be considered as stricter grading feedback because the student would be shown a larger missing image component which is a larger erroneous image component.

The flow chart in FIG. 16, along with FIGS. 3C and 3D, describe a method to extend a credited component of a solution image 117 to remove or reduce a gap in a feedback image. In FIG. 16, step 1712 starts with a credited component of a solution image 117. In step 1714, a credited component of a solution image 117 is expanded into a region of a credited component of a solution region 158, examples of which are shown in FIG. 3C as components 117A and 117B with solution regions 158A and 158B (shown with yellow shading). The expanded regions 158A and 158B close the small gap 147 at the upper right corner between credited image components 117A and 117B, effectively merging to form a single region. Similarly, credited component 117C is expanded to define region 158C. Creation of regions 158 can be done by thickening lines of 117, by dilating the image 117, or by other methods as are known in the art. Step 1716 in FIG. 16 utilizes a region of credited component of a solution image 158 along with the solution image 112 which is acquired in step 1700. In step 1716, an extended credited component of a solution image is created. This extension can be implemented by finding the components of the solution image 112 that are contained in a region of credited component of a solution image 158. One method of finding this extension is to perform a pixel AND operation between the solution image 112 and a region of credited component of a solution image 158. The different segments of a missing image can be extended one component at a time or all components together with a single dilation and pixel AND operation. FIG. 3D provides examples of the extended image segments 160A and 160C. As shown, the extended credited component of a solution image 160A and 160C extend to the ends of regions 158A, 158B and 158C. The extended credited component of a solution image 160 can be used in a hint image or a peek image. Using an extended credited component of a solution image 160 can reduce or eliminate gaps to increase feedback clarity to the student. This approach can be considered as more lenient grading feedback because the student would be shown a larger component of the solution image 112. This can be especially helpful for hint feedback when the portion of the student sketch 108 that is correct is not entirely clear. Extending the elements of the hint feedback image to include more of the solution can provide a more readily understood hint for the student.

Figure 2I:
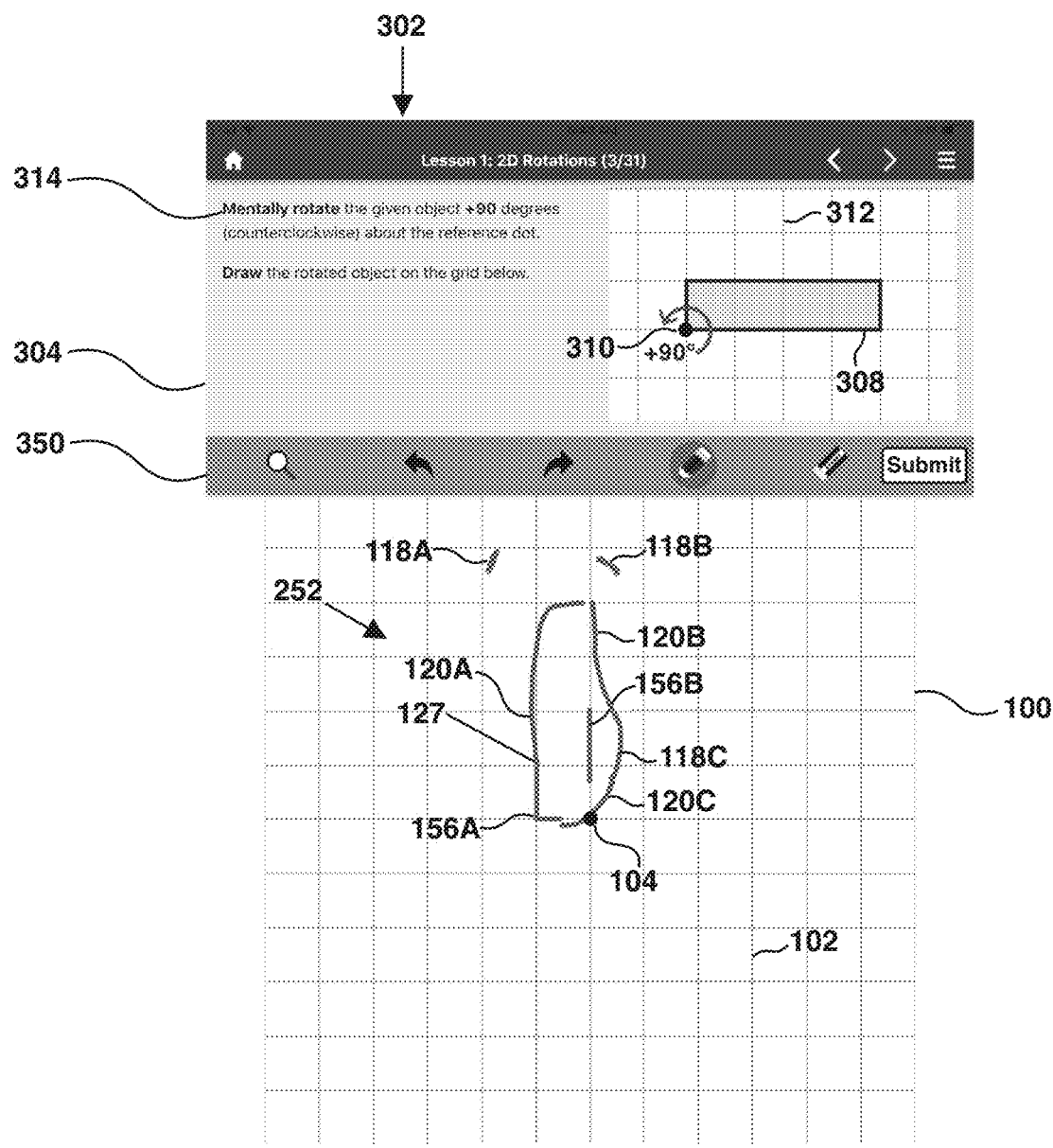
FIG. 2I shows a peek image with and expanded missing image components for the assignment described in FIG. 2A.

FIG. 2I provides an example of a peek feedback image 252 with extended missing image components 156 with segments 156A and 156B (shown in blue), where segment 156A eliminates the gap at the lower end 127 of segment 120A and reduces the size of the other gap between the extended missing image components and the correct image component 120C. This can be compared to the peek feedback image 152 in FIG. 2F, which has gap $d_f$ at the lower end 127 of segment 120A and does not apply extensions to the missing image components 116A and 116B. In FIG. 2I, segment 156B is also extended in comparison to missing image component 116B in FIG. 2F, thus reducing the gap between the extended missing image components and a correct image component.

Figure 2J:
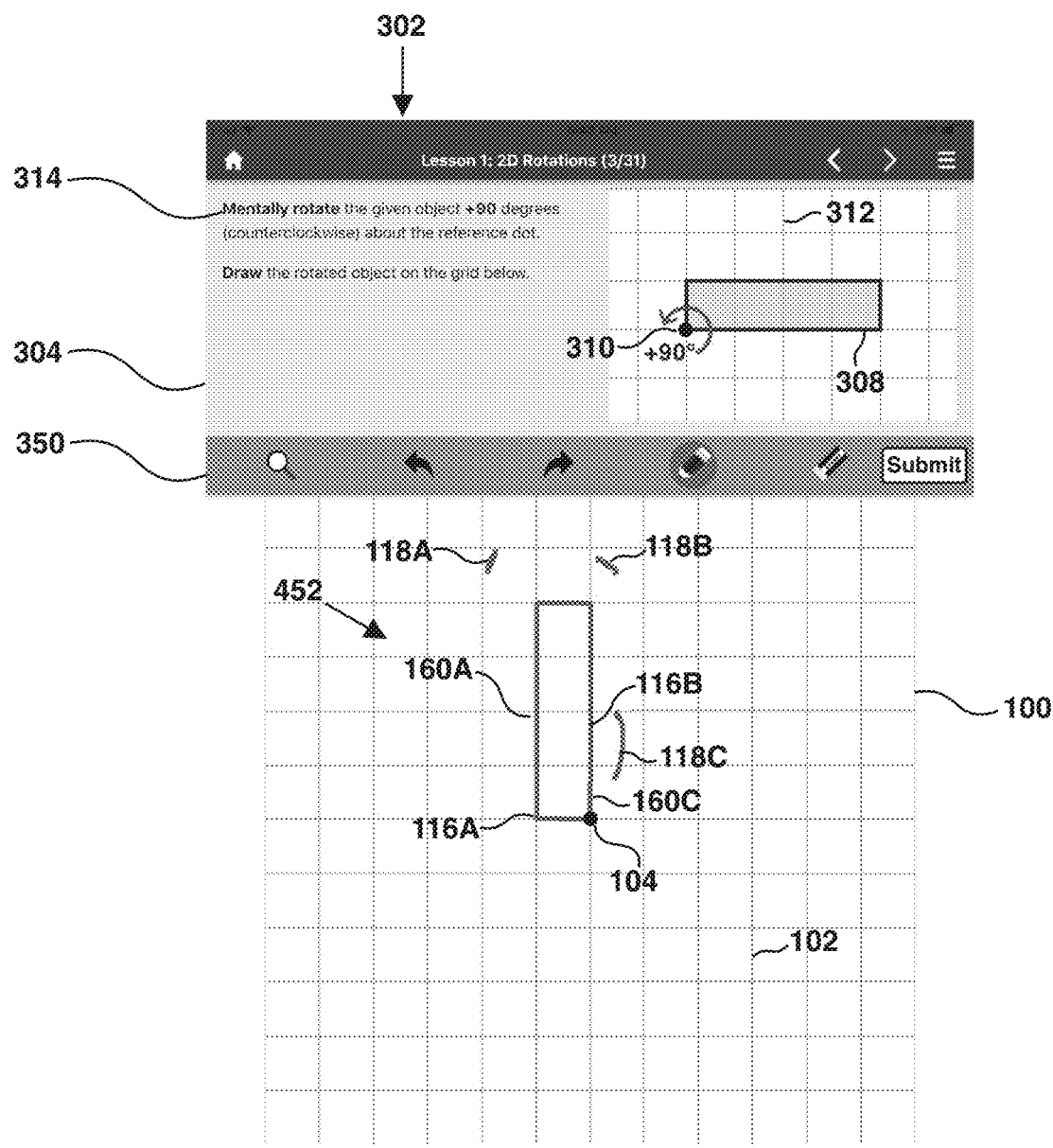
FIG. 2J shows a peek image with credited components of a solution image and expanded missing image components for the assignment described in FIG. 2A.

FIG. 2J provides another example of a peek feedback image 452 with extended credited components of a solution image 160, with components 160A and 160C (shown in green) with (non-extended) missing image components 116A and 116B (shown in blue). An alternative peek feedback image would include credited components of a solution image 117 (segments 117A, 117B and 117C) from FIG. 2H, with extended missing image components 156 from FIG. 2I. Both of these peek feedback images would provide a clear shape of the solution image 112, while also showing which parts of the assignment the student did correctly, as shown in FIG. 2J. Both of these peek feedback images have reduced or eliminated any gaps in the image.

FIG. 2H illustrates a sample hint feedback image 250 with segments 117A, 117B and 117C of credited component of a solution image 117. In a similar manner, a hint feedback image can be created using extended credited components of a solution image 160. The image extensions can provide the student with better insight into the solution image 112.

Hint feedback to the student is an important element of providing an effective educational tool. The figures described herein illustrate several examples of ways in which hint feedback can be presented to assist the student. Based on these examples, it will be readily apparent to those of skill in the art that other alternative feedback approaches may also be employed. In general, a hint is intended to provide guidance without completely revealing the solution to an assignment. A hint image 150 or 250 can be presented to a student when they request a hint. Effective hints can include the various image components described herein, alone or in combination, including, but not limited to, correct image components 120, credited components of a solution image 117, which inherently include components of a solution image 112, and extended credited components of a solution image 160. The amount of extension applied to an extended component could be large or small, where a larger extension will reveal more of the solution to the student. A hint can also include regions such as portions of a solution region, allowing a student to see how close they are to an edge of a region. A hint need not be a static image. For example, a hint could be an animation that depicts morphing between correct image components 120 and credited components of a solution image 117. An animated hint could display correct image components 120 dissolving with credited components of a solution image 117 appearing. Another hint could be an animation that shows an extended credited component of a solution image 160 where the amount of extension is varied. As the amount of extension increases, it could appear to the student as an animation that shows the sketch being completed. The increasing extension could be applied to all extended credited components of a solution image 160 at the same time, or the extensions could be performed one image component at a time to allow the students to focus on just one area of a sketch.

Peek feedback to the student is also an important part of creating an effective educational tool. A peek at the solution of an assignment can provide more educational benefit than simply showing the student a final solution to an assignment. A peek can also reveal to the student where they made a mistake, so that they are better prepared for future assignments. The figures described herein provide illustrative examples of possible ways in which peek feedback can be presented to assist the student. Based on these examples, it will be readily apparent to those of skill in the art that other alternative feedback approaches may also be employed to enhance the learning experience. A peek image 152, 252, or 452 can be presented to a student when they request a peek at the solution. The peek can include a solution image 112. The peek can also include missing image components 116 or extended missing image components 156, allowing the student to see the portions of the solution that they missed. The peek can include additional image components 118, allowing students to see the components of their sketch image 108 that were erroneous. The peek can include correct image components 120 and/or credited component of a solution image 117. The peek can include regions such as the solution region 114 so students can see where their sketch 108 strayed from this region. As with hint feedback, a peek need not be a static image, but can be animated, for example, to show a morphing between correct image components 120 and credited components of a solution image 117.

Figure 4A:
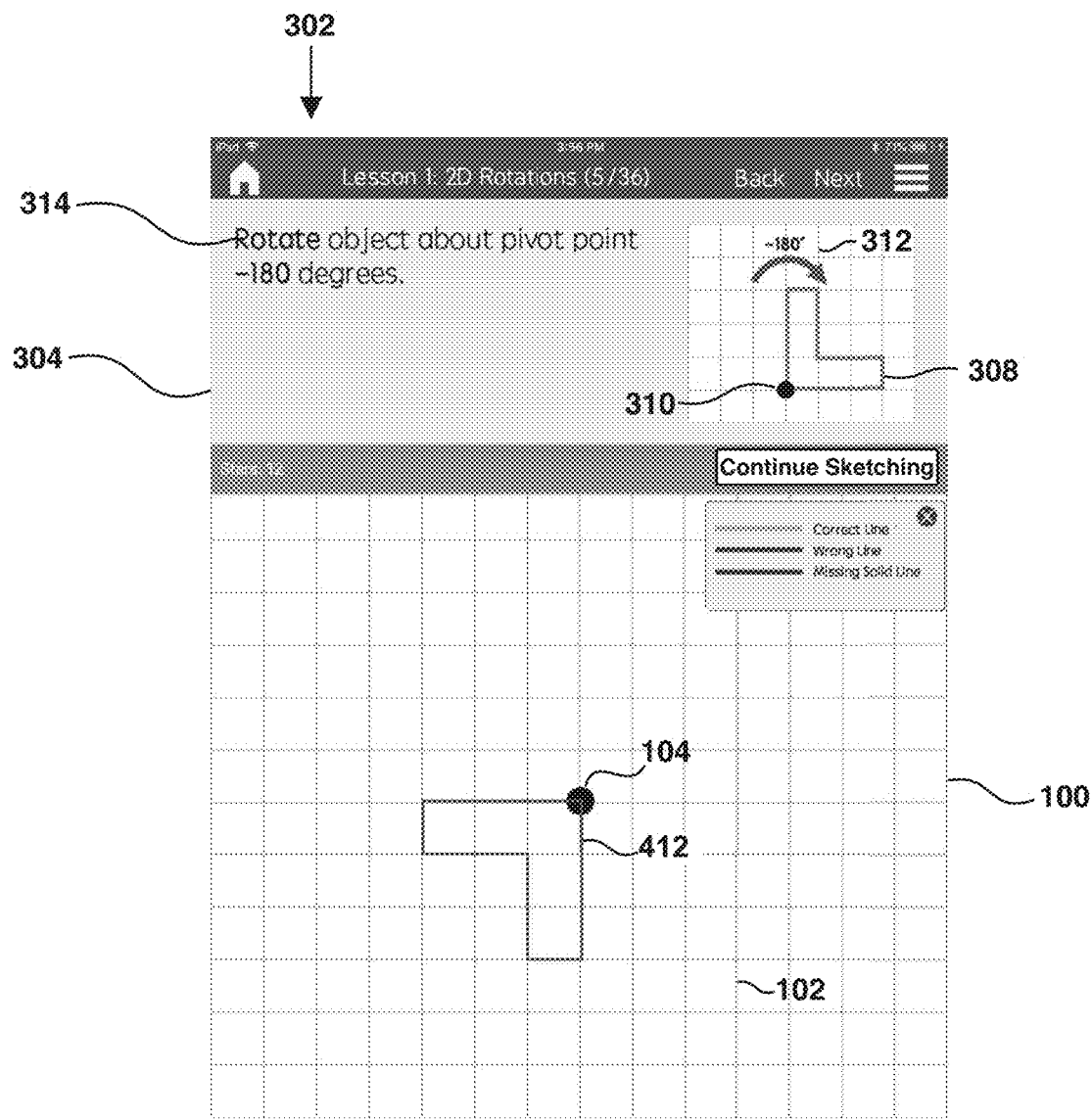
FIG. 4A shows a solution image for a sketching assignment.
Figure 4B:
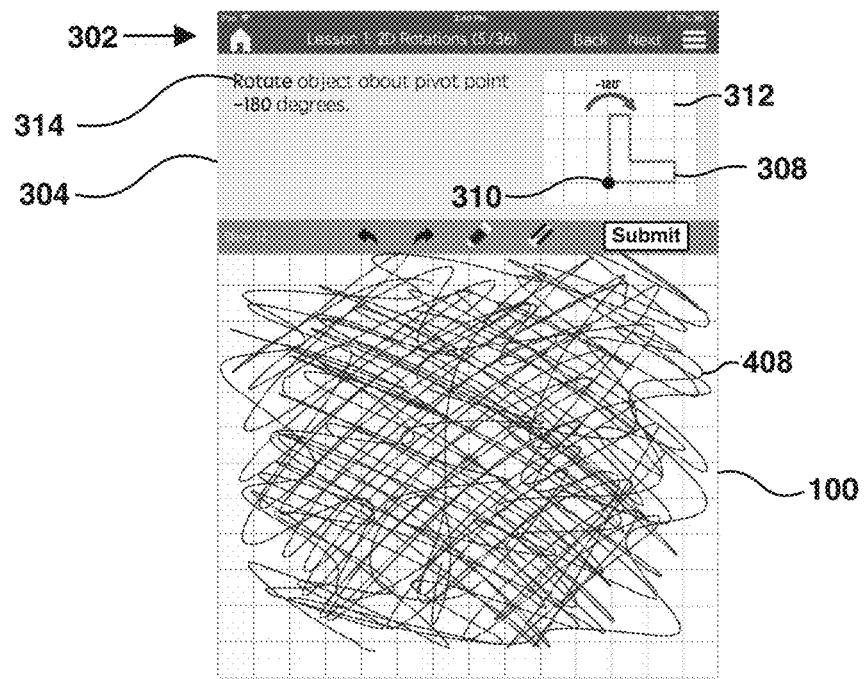
FIG. 4B shows a scribbled sketch image drawn by a user for the assignment described in FIG. 4A.

The option of a hint 134 in FIG. 1 is intended to provide the students with a degree of assistance that is less than the peek option 136. To encourage persistence, students may be rewarded with points or grades to select a hint rather than a peek. However, some students may attempt to gain more information from a hint than an expert teacher would be willing to provide. For example, a student may scribble randomly all over a sketch window as shown in FIG. 4B, and then select a hint option. If the student's scribble 408 extends across a significant portion of the sketching window 100, the hint feedback image could reveal the shape of the complete solution. An expert teacher would recognize the student's sketch 408 as a random scribble without a genuine effort to complete the assignment and would not be willing at this point to give the student a peek at the solution. Indeed, the scribble may be an attempt by the student to avoid the point reduction that comes with asking for a peek at the solution. Accordingly, it would be desirable for a sketch grading algorithm to be able to detect student scribbles or other markings that are indicative of a less than sincere effort to complete the assignment.

Figure 4C:
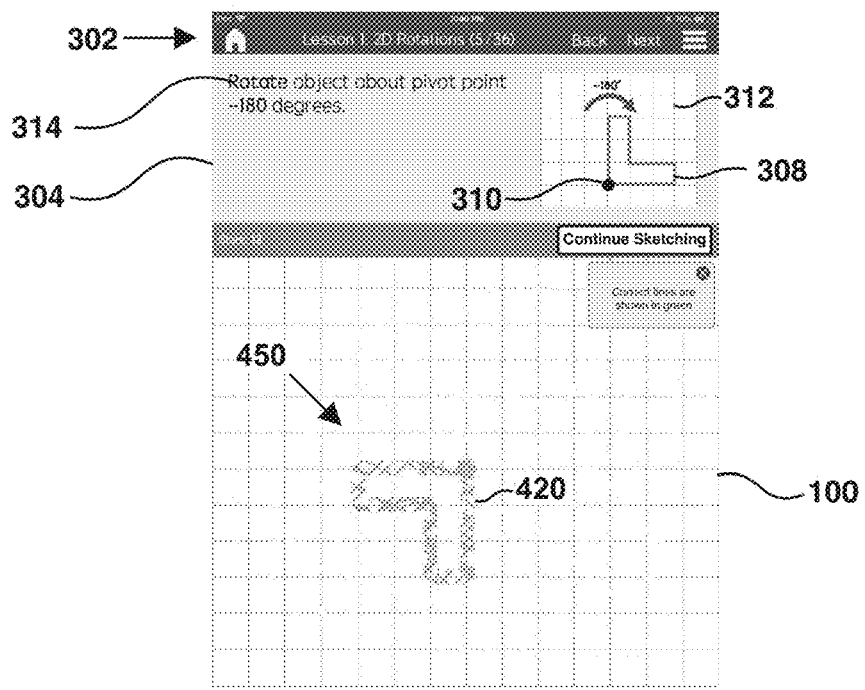
FIG. 4C shows a hint feedback image for the assignment described in FIG. 4A and sketch image shown in FIG. 4B.

One way to detect a possible scribble is to compare the amount of content in the student's sketched image 408 to the amount of content of the solution image 112. The amount of content of a sketch can be quantified by determining the cumulative length of lines or areas in a sketch. Another way to quantify the amount of content of a sketch is by the cumulative number of pixels in the sketch. When using the pixel approach, it may be helpful to normalize the estimate by dividing by the width of the line thickness. For example, if the student sketches with a drawing tool that creates linewidths of 4 pixels, and the sketch solution is drawn with linewidths of 2 pixels, to normalize the measurements, both cumulative pixels amounts should be divided by the respective widths of the lines used. If the normalized cumulative pixels in the sketch image 408 is significantly larger that then the normalized cumulative pixels in the solution image 112, the program could create a warning about possible scribbling and not show the hint image to the user. In the example shown in FIG. 4A, the solution image 412 is provided for an assignment 314 instructing the student to "rotate object [308] about pivot point [310]—180 degrees." FIG. 4B shows a sketch image 408 that is scribbled by the student for the assignment 314. FIG. 4C shows a hint feedback image 450 for the same assignment. As seen in FIG. 4C, the correct image component 420 in the hint feedback contains many segments due the large content of the scribbled sketch image 108. Accordingly, a student would be able discern the general shape of the solution image just from the hint feedback image in FIG. 4C. The scribbled sketch 408 shown could be detected as a scribble by ratio of the large number of pixels in the sketch image 408 in FIG. 4B to the relatively small number of pixels in the solution image 412. Another way of detecting a scribbled sketch image is by comparing the amount of content in a sketched image to a given threshold.

An example of a solution region 114 is shown in FIG. 2D, where it is shown with a width $w_{sol}$. As illustrated, the solution region width $w_{sol}$ is uniform along all components of the solution image 112. However, the solution width does not need to be uniform for a given solution region 114. In addition, the flow chart in FIG. 9 describes the solution region as being created from a solution image in dilation in step 1134. It should be noted that a solution region may be created using other approaches. For example, the assignment author may define the solution region at the time they create the solution image 112, before the student creates the sketch image 108.

Figure 6A:
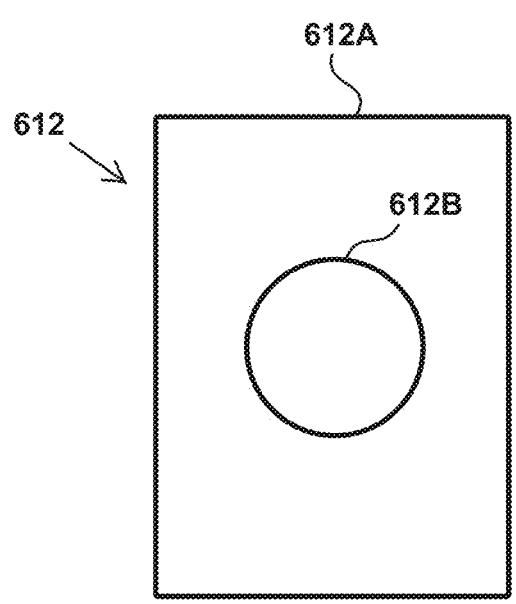
FIG. 6A shows a solution image.
Figure 6B:
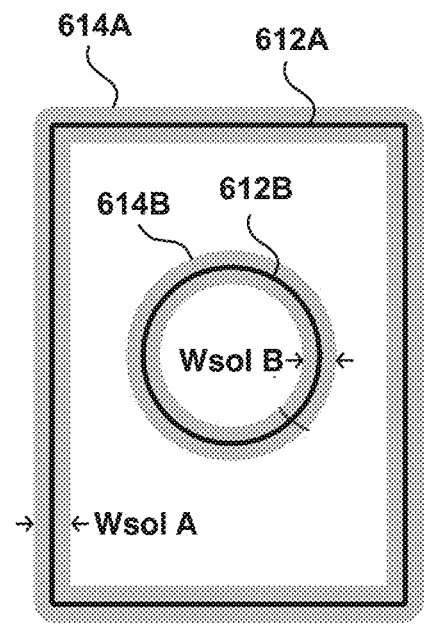
FIG. 6B shows a solution region with different widths for the assignment described in FIG. 6A.

FIG. 6A shows an example of a solution image 612 with two components, a rectangle 612A and a circle 612B. FIG. 6B shows a possible solution region that corresponds to the solution image in FIG. 6A. In FIG. 6B, the solution region that corresponds to the rectangle 612A is shown as region 614A, and the solution region that corresponds to the circle 612B is shown as region 614B. The width of solution region 614A is $w_{solA}$, which is smaller than width $w_{solB}$ for solution region 614B. The size of the solution region width is defined by the assignment author who may have determined that drawing a circle freehand is more challenging than drawing a rectangle, and therefore selected a relatively larger width $w_{sol}$ for solution region 614B.

Figure 7A:
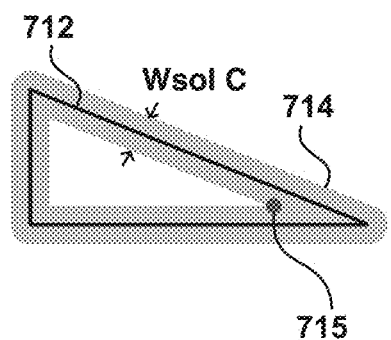
FIG. 7A shows a solution image and solution region with a constant width.
Figure 7B:
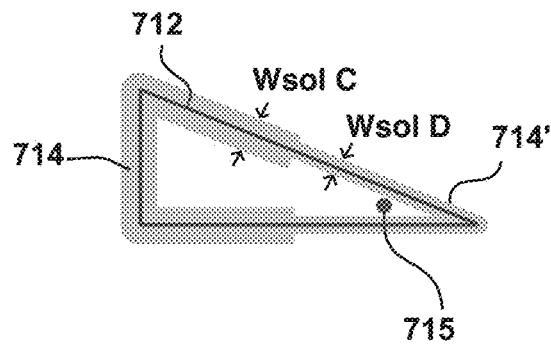
FIG. 7B shows a solution image and solution region with different widths.

Another example of an assignment that could benefit from a solution region with different widths is shown in FIGS. 7A and 7B. In FIG. 7A, the solution image 712 is in the shape of a triangle, and the solution region 714 has a uniform width $w_{solC}$. There is a point 715 close to the corner on the right side of the solution image 712. In FIG. 7A, the point 715 is within the solution region 714, which means that an acceptable sketch image component could pass through point 715 and still be within the solution region 714. However, the assignment author may consider it important for an acceptable sketch to include a relatively sharp angle and pass to the right of point 715. To ensure that this important feature is properly graded, a solution region with different widths can be used, as shown in FIG. 7B. Closer to the right corner of the solution image, the width $w_{sol}$ of solution region 714' is relatively small, while on the left portion of the image, solution region 714 is $w_{solC}$ as in FIG. 7A. Using this scheme, point 715 is now excluded from the solution region 714'. Thus, a sketch image that passes through point 715 would have an erroneous additional image component. The greater width $w_{solC}$ of solution region 714 on the left of the sketch allows for more lenient grading where the sketch author considers it appropriate. In this fashion, the shape and width of a solution image can be adjusted to suit the desired grading for a specific assignment.

In certain drawings, it can be desirable to draw dashed lines. For example technical or engineering drawings, lines that are hidden in an orthographic view are typically drawn as dashed lines while visible lines are drawn as solid lines. In another example, in design patent drawings, dashed lines are used to show elements in drawing that are not claimed as part of the design. A sample assignment in which the solution requires drawing of a hidden line is provided in FIG. 19A. An assignment window 304 contains an assignment text description 314 which indicates that Front, Right, and Top orthographic views should be drawn in alignment with orthographic protocols. An assignment image 308 shows an isometric drawing of a 3D shape aligned with an assignment grid 312, which in this assignment is an isometric grid that contains lines at +30 degrees, −30 degrees, and vertical grid lines. A reference dot 310 is shown at relative to the assignment image 308.

Figure 19A:
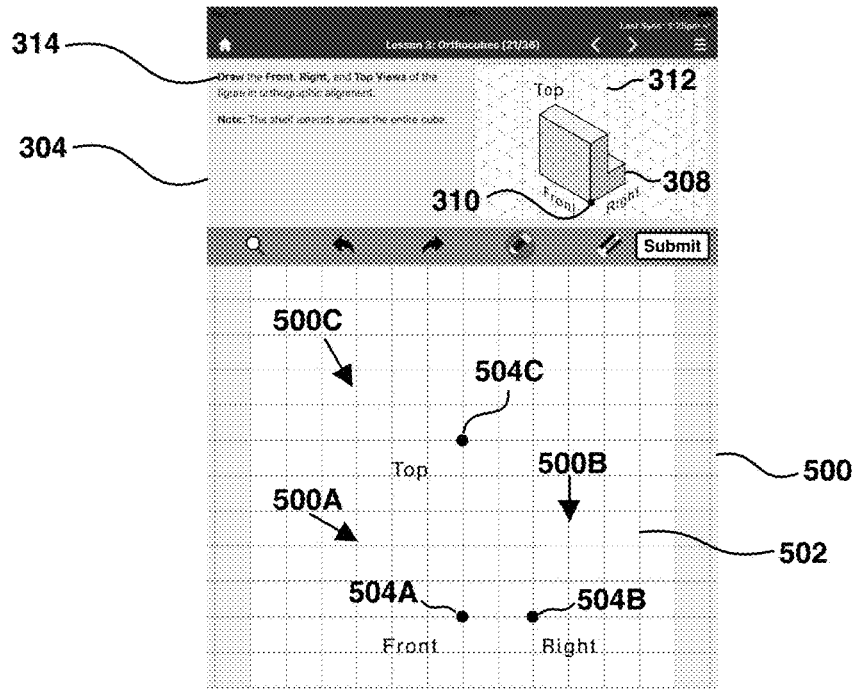
FIG. 19A shows an assignment window and sketching window for an assignment requiring drawing of orthographic views.

FIG. 19A shows a sketch window 500 and a sketch grid 502. In this assignment, the sketch grid 502 consists of equally spaced horizontal and vertical lines, which is suitable for drawing orthographic views. Three reference dots are provided within the sketch window to properly locate the different views relative to reference dot 310 in the assignment image 308. This allows the student to orient the assigned views and may also serve as a starting point for each sketch. Dot 504A in the lower left quadrant of sketch window 500 is a reference dot for the assigned Front View. Dot 504B in the lower right quadrant of the sketch window is a reference point for the Right View, and 504C is a reference dot for the Top View. The general area in which the Front View is meant to be drawn, i.e., the lower left quadrant, is designated as 500A. Similarly, the Right View is meant to be drawn in the area designated as 500B, and the Top View is meant to be drawn in area 500C.

Figure 19B:
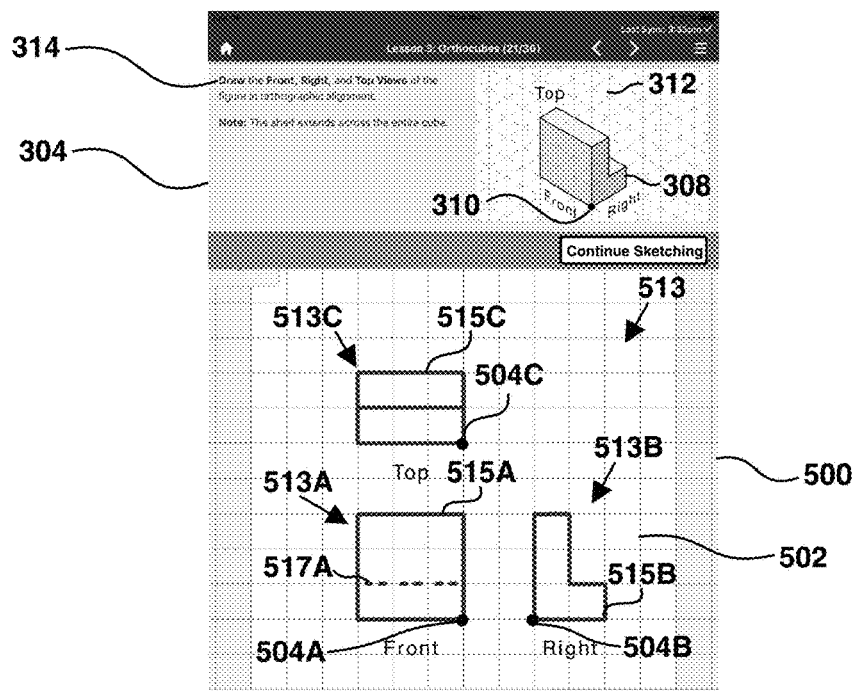
FIG. 19B shows a solution image for an assignment requiring drawing of orthographic views.

FIG. 19B provides a sample solution image 513 for a solution of the complete assignment of FIG. 19A. The solution image 513 may be shown if a student elects to peek at a solution without drawing an image. The solution image 513 includes the Front View 513A, which contains two components: a solid lines solution image 515A and a dashed line solution image 517A, which represents a hidden line in the Front View. In the assignment of FIG. 19A, the solution image for the Right View 513B contains only a solid lines solution image 515B. The solution image for the Top View 513C contains only a solid lines solution image 515C.

When grading an assignment with dashed lines, it is appropriate to determine whether the student intended to draw dashed lines, and if these intended dashed lines are in the correct location. The grading approach can also evaluate if the student intended to draw dashed lines in locations where they should have drawn visible (solid) lines. Accordingly, it can be advantageous for a grading algorithm to detect the presence of intended dashed lines relative to a solution. It can also be advantageous in a sketch training program to provide feedback to students regarding the correctness of their dashed line representations.

In one implementation, a separate pen tool can be provided for solid lines and another for dashed lines. When a user intends to draw a solid line, they would select the appropriate pen from a toolbar or otherwise indicate their intent. They would select a different pen when they intended to draw a dashed line. Different colors could optionally be used to distinguish dashed and solid lines. In addition, the dashed line pen could automatically draw dashes and gaps as the pen travels through a contiguous trajectory. In the implementation with separate pens for solid and dashed lines, the grading could be implemented by considering two separate images, with each image coded based on the type pf pen used to create the drawing. The solid line pen trajectories could be compared to the solid lines in the solution, and the dashed line pen trajectories could be compared to the dashed lines in the solution. Due to the distinctive coding used for the dashed lines and the solid lines, the different line types can be easily distinguished, thus allowing both images to be graded using the method described herein for grading sketches with only solid lines in the solution.

However, in certain cases is can be desirable for a student can draw solid lines and dashed lines with the same drawing tool, which is how one would typically draw with paper and pencil. The following describes a method for grading assignments in which the solution has both solid lines and dashed lines, and where a single drawing tool is used. In these cases, the student indicates their intent to draw a dashed line by actually drawing a sequence of dashes.

The sizes of the dashes and the gaps between the dashes is an important consideration for grading dashed lines. A teacher could choose to be strict and require that dashes be drawn at specific locations and of specific lengths, in which case the methods described above can be applied where the solution image would include dashed lines and widths of the solution region can be set appropriately. For example, general guidelines may be provided to the student, for example, to use two dashes per grid as defined by grid lines 502. While it would be easier to grade, it may not generally be appropriate to restrict the student to drawing each dash in an exact location to properly represent a hidden line. Accordingly, a grading algorithm should have the ability to determine if a student intended to draw a dashed line in a certain location based on less stringent criteria. In a drawing with a dashed line, the exact locations of the dashes may not be as important as the general representation that the line is drawn as dashed. Accordingly, a teacher grading a sketch with a dashed line may want to be somewhat flexible, such that the grading becomes more a question of whether the student intended to draw a dashed line in a certain location.

Figure 20A:
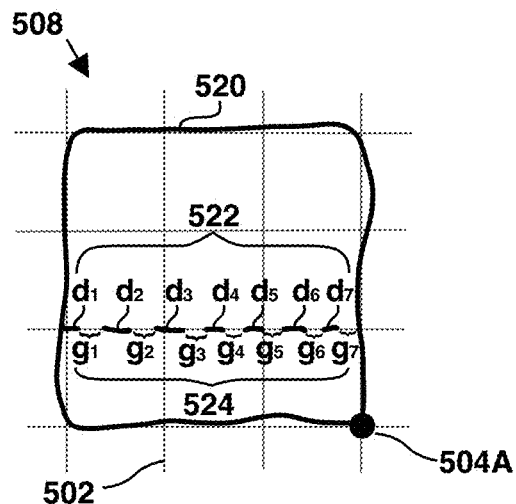
FIG. 20A shows a sketch of a Front View of the assignment in FIG. 19A, where a dashed line is drawn in an acceptable fashion.

FIG. 20A shows a sample sketch of the Front View for the assignment shown in FIG. 19A as properly drawn. A solid line 520 properly represents the visible lines in the view with reference dot 504A at the lower right corner. A dashed line is properly drawn to represent a hidden line, which consists of a sequence of dashes 522. Each dash 522 drawn by the student is identified in FIG. 20A as "d1" through "d7". The gaps 524 between the dashes are identified as "g1" through "g7". On the left side of the figure, dash d1 touches the vertical left segment of solid line 520, but on the right side, dash d7 does not touch the vertical right segment of solid line 520. A strict grader may require that dashed lines start and end while touching the solid line 520. However, the method described here considers the dashed line drawn in FIG. 20A as properly drawn, and many teachers would recognize that it was the student's intent was to draw a dashed line in the appropriate location.

Figure 20B:
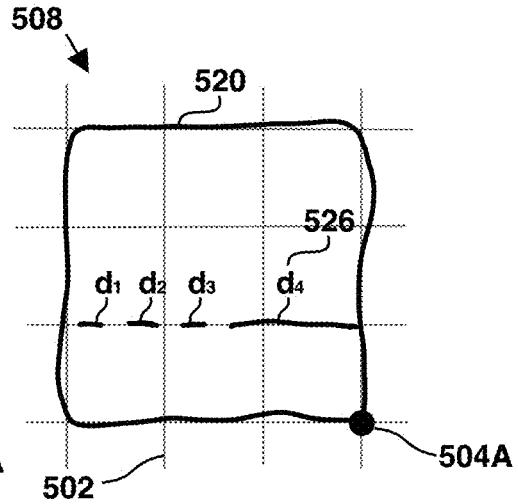
FIG. 20B shows a sketch of a Front View of the assignment in FIG. 19A, where a dashed line is drawn with a dash that is too large.
Figure 20C:
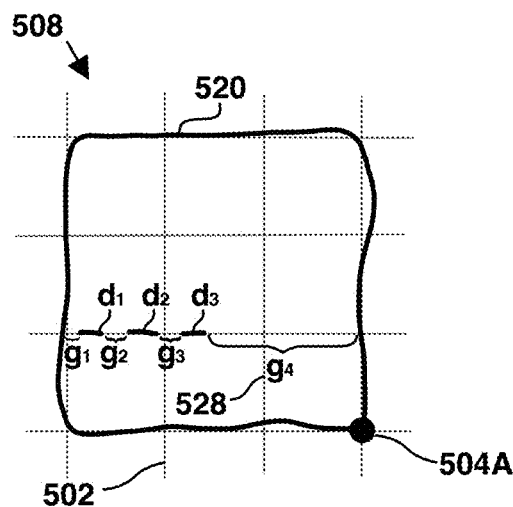
FIG. 20C shows a sketch of a Front View of the assignment in FIG. 19A, where a dashed line is drawn with a gap that is too large.

FIG. 20B shows an example of an incorrectly drawn Front View for the assignment shown in FIG. 19A. In this sketch, a hidden line is not correctly represented because dash 526 (also indicated as dash d4) is too long. An expert teacher might interpret the excessively long dash 526 as a student intent to draw a solid line in that area. FIG. 20C shows an incorrectly drawn Front View for the assignment shown in FIG. 19A, where the error involves incorrect representation of the dashed line due to an excessively long gap 528, also indicated as gap g4. An expert teacher could interpret the excessively long gap 528 as an indication that the student did not intend to draw a dashed line in that area.

Figure 21A:
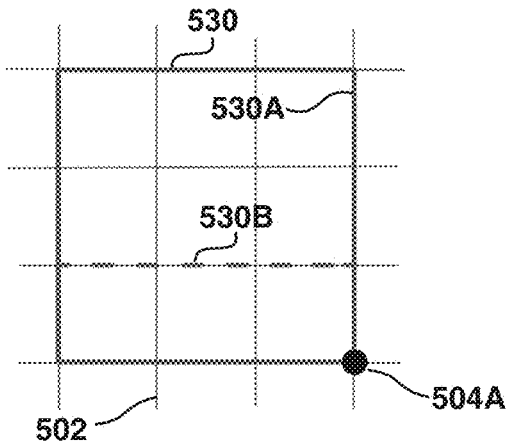
FIG. 21A shows a sketch solution for an assignment that includes solid and dashed lines as would be drawn by a draftsman.
Figure 21B:
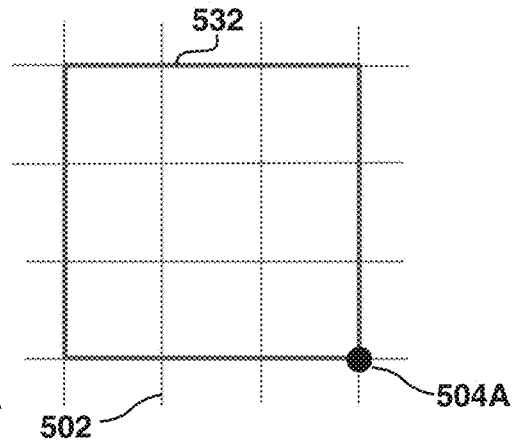
FIG. 21B shows the solid line locations of a sketch solution for an assignment that includes solid and dashed lines.
Figure 21C:
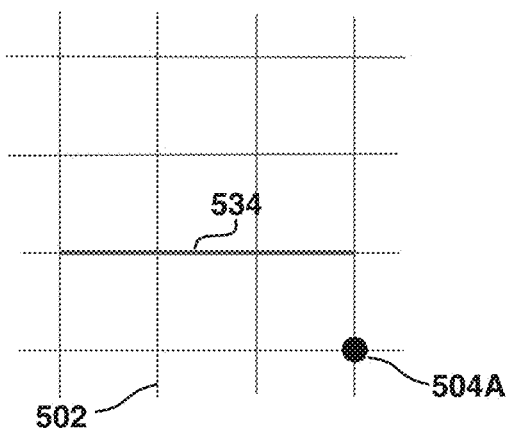
FIG. 21C shows the dashed line locations of a sketch solution for an assignment that includes solid and dashed lines.
Figure 21D:
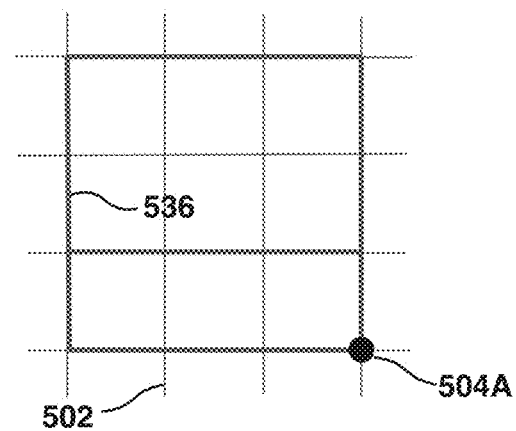
FIG. 21D shows the combined solid and dashed line locations of a sketch solution for an assignment that includes solid and dashed lines.

FIGS. 21A-21D are examples of images that can be used for grading a sketch where the solution has a dashed line, still using the example of the Front View of the assignment shown in FIG. 19A, where the correct solution is 513A in FIG. 19B. FIG. 21A shows a visually correct solution image 530 (identical to solution 513A) as would typically be drawn by an expert draftsman. Image 530 can contain visually correct solid lines 530A and visually correct dashed lines 530B, where the dashed line is drawn with properly sized and located dashes. FIG. 21B shows a solution image for only the solid lines 532 (identical to 530A). FIG. 21C shows a solution image of the location of dashed lines that are drawn as a solid line 534. FIG. 21D shows a combined representation image 536 of the solid and dashed line locations, with both locations being represented as solid lines. Image 536 can be generated by an overlay of images 532 and 534, or by a bitwise "AND" operation of pixels in images 532 and 534.

Figure 17:
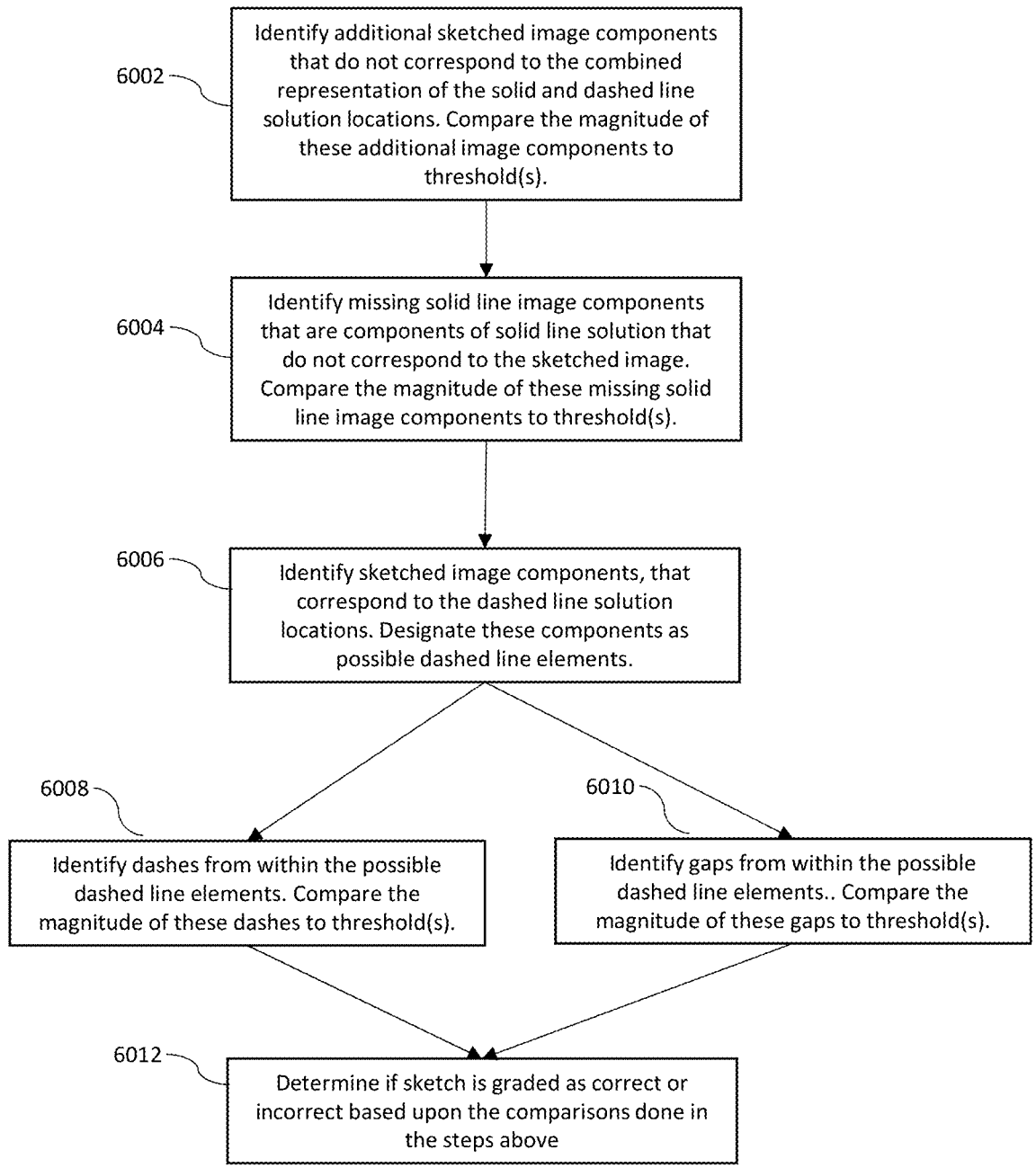
FIG. 17 is a flow chart showing a flow chart for steps for grading images having dashed lines.

The steps of a method for grading sketches that include one or more dashed lines in the solution are shown in the flowchart of FIG. 17. In various parts of this method, the magnitudes of image components are identified, which can be achieved using methods such as a bounding box, number of pixels, or one of the other methods described previously for identifying the magnitude of an image component. In step 6002, additional image components of the sketch image 508, i.e., those elements of the image that do not correspond to the correct combination of solid and dashed lines, are identified. The magnitudes of the additional image components are determined using the procedure described above with reference to FIG. 9, i.e., steps 1102, et seq. In step 6004, missing solid line image components that are components of solid line solution 532 that do not correspond to components of sketch image 508 are identified. The magnitudes of these missing solid line image components are compared to threshold(s) as previously described. Because dashed lines inherently have missing features by virtue of the gaps between the dashes, the grading process must be able to distinguish between intended and unintended gaps. In step 6006, components of sketch image 508 that correspond to the representation of the dashed line locations 534 are identified. These components as designated as "possible dashed line elements," which are then subjected to two separate analysis steps. Dashes within the possible dashed line elements are identified in step 6008. The magnitudes of the identified dashes are then compared against the thresholds for the dashes. The possible dashed line elements are also evaluated to identify gaps in step 6010. The magnitudes of the gaps are then compared to the thresholds. Next, the results of steps 6008 and 6010 are combined in step 6012 to determine if the sketch should be graded as correct or incorrect based upon the comparisons done in the previous steps.

Figure 22A:
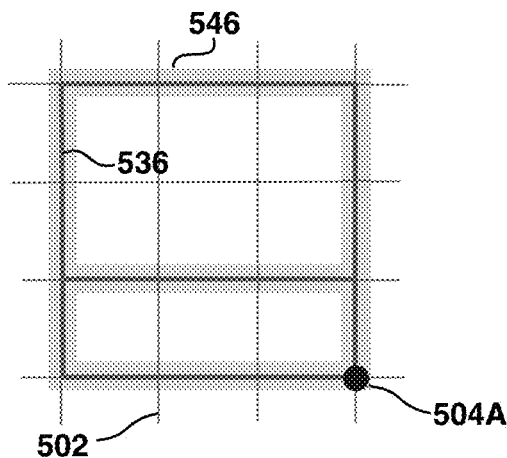
FIG. 22A shows a solution region of combined solid and dashed line locations.
Figure 22B:
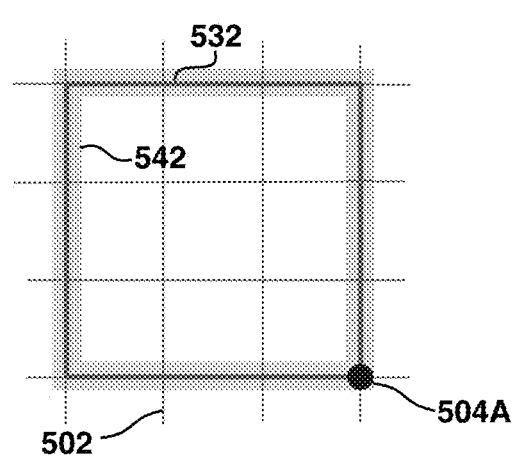
FIG. 22B shows a solution region of solid line locations.
Figure 22C:
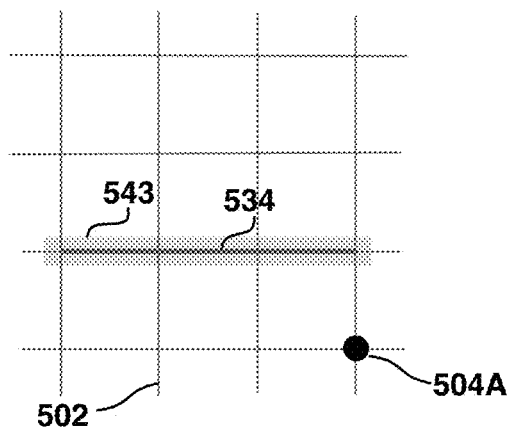
FIG. 22C shows a solution region of dashed line locations.
Figure 22D:
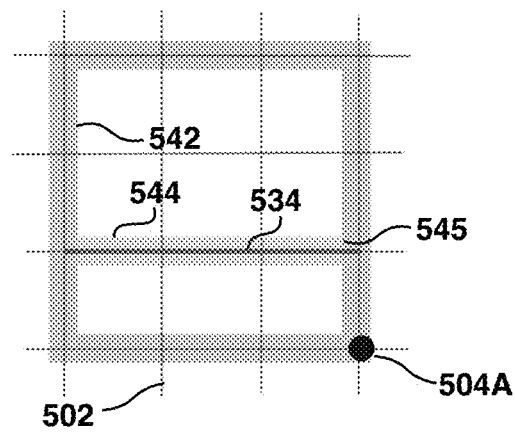
FIG. 22D shows a reduced solution region of dashed line locations.

Solution regions can be utilized to grade sketches where the solution has solid and dashed lines. FIGS. 22A-22D are sample images with solution regions that can be used for grading a sketch where the solution has a dashed line, still using the example of the Front View of the assignment of FIG. 19A, the correct solution for which is solution 513A in FIG. 19B. FIG. 22A shows a solution region for combined solid and dashed line locations 546. Solution region 546 can be generated by dilating or broadening the lines of solution image 536, which is the combined representation of the solid and dashed line solution locations. FIG. 22B shows a solution region 542 for solid line solution locations 532. Region 542 can be generated by dilating or broadening lines 532. FIG. 22C shows a solution region 543 for dashed line solution location 534, also referred to as a dashed line solution region. Solution region 543 can similarly be generated by dilating or broadening the line 534. FIG. 22D shows a reduced region for dashed line solution locations 544, which is reduced from region 543 by subtracting region 542 from region 543. In FIG. 22D, this reduction removes the end portions of region 543 and thus does not include portions that could be considered as part of a solid line sketch in the region for dashed lines. This reduction can improve the clarity of the hint feedback image that is described further in this document.

Figure 18:
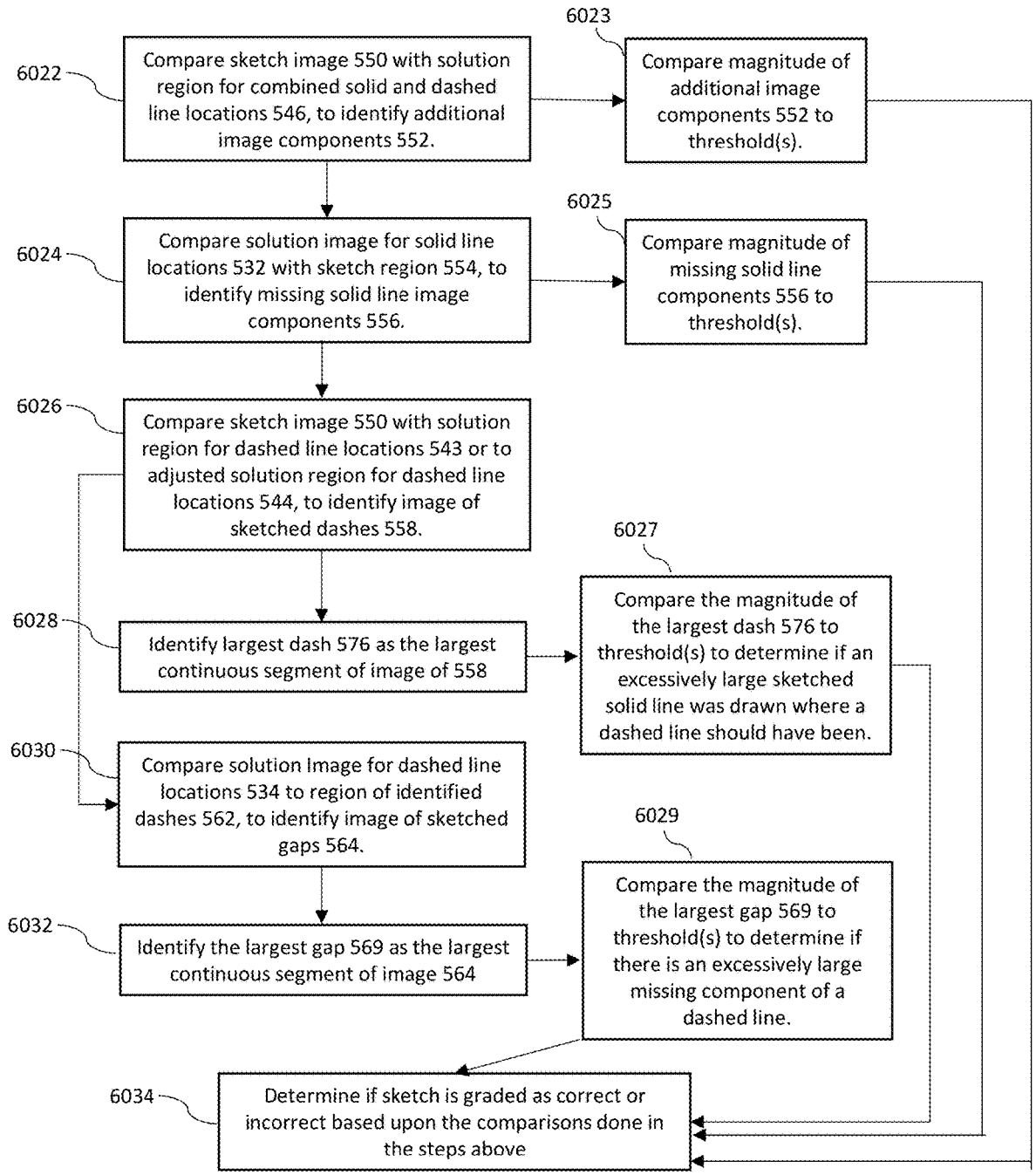
FIG. 18 is a flow chart showing the method for grading a sketch containing dashed lines.

A method that uses regions for grading sketches that include a dashed line or multiple dashed lines in the solution is shown in a flowchart in FIG. 18. While this method is described using as an example the Front View in the assignment shown in FIG. 19A and solution shown in FIG. 19B, it will be readily apparent to those in the art that the method can be applied to other geometries of sketches and sketching assignments. A sample sketch referenced in this description is shown in FIG. 23A as image component 550. This sample sketch includes a number of incorrect features, including an additional image component, a missing solid line component, and an excessively long gap in the dashed line location. Another example sketch referenced in this description is shown in FIG. 24A and has an image component 574. The sample sketch in FIG. 24A has a slightly different set of errors, including an additional image component, a missing solid line component, and an excessively long dash in a dashed line location 576. Referring to the process flow in FIG. 18, in initial step 6022, additional image components that are not part of the solid or dashed line solution are identified. Step 6022 analyzes sketch image 550 in FIG. 23A by comparing it to a region 546 of combined solid and dashed line locations, as shown in FIG. 22A. In step 6022, sketch image 550 is compared to region 546. Specifically, components of image 550 that are outside of region 546 are identified as additional image components. One way this comparison can be done is by identifying pixels of image 550 that are not part of the pixels that define region 546. FIG. 23B shows the additional image component 552 that lies outside of region 546.

A following step 6023 compares the magnitudes of the additional image components 552 to pre-determined thresholds. As described previously, a magnitude of an image component can be determined in a variety of ways including the number of pixels, bounding box, cumulative length, or other methods. These multiple methods of quantifying the magnitude of an error can be used to compare to a number of thresholds. If the magnitude of image component 552 is larger than the specified threshold, the sketch would be graded as incorrect due to an excessively large additional image component that was drawn incorrectly.

In step 6024, image components of the solid line solution 532 that are missing from the sketch 550 are identified. Step 6024 utilizes the solid line solution image 532 as shown in FIG. 21B, and sketch region 554 as shown in FIG. 23C. Region 554 can be generated by dilating or broadening the sketch image 550. In step 6024, image 532 is compared to region 554. Specifically, any components of image 532 that are outside of region 554 are identified as image components 556 that are missing from the solid line solution 532, as shown in FIG. 23H. Referring again to FIG. 18, step 6025 compares the magnitude of the missing image components 556 to various pre-determined thresholds. If the magnitude of missing image components 556 is larger than a specified threshold, the sketch can be graded as incorrect due to an excessively large missing solid line image component.

Step 6026 in FIG. 18 identifies components of the sketch that are possible dashed line elements. In this step, either the region for dashed line locations 543 (in FIG. 22C) or the adjusted solution region for dashed line locations 544 (FIG. 22D) can be used. All components of the sketch image 550 that are inside the region 543 (or alternatively 544), are defined as an image of sketched dashes 558, shown in FIG. 23D. The image of sketched dashes 558 is used in steps 6028 and 6030.

Step 6028 evaluates whether there is an oversized dash in the dashed line region. The largest contiguous segment of image of 558 identifies the largest dash drawn. The previously described methods for identifying contiguous segments and quantifying their magnitudes can be used. To illustrate, FIG. 23E shows dashes d1, d2, and d3 in sketch dashed line 558, and their corresponding bounding boxes b1, b2, and b3, which define grouped bounding box 560. In step 6027, the magnitude of the largest dash 576 (FIG. 24A) is compared to a pre-determined threshold to determine if an excessively large sketched solid line was drawn where a dashed line should have been.

Step 6030 evaluates whether there is an excessively large gap in the dashed line region. Referring to FIG. 23E, the image of sketched dashes 558 is used to generate a region of identified dashes 562, shown in FIG. 23F. Region 562 can be generated by dilating image 558. Gaps are identified as components of the solution image for dashed line locations 534 that are not in the region of identified dashes 562, shown within gap grouping 564 in FIG. 23F as g1, g2, g3, and g4. Individual gaps can be identified as contiguous segments within gap grouping 564, and the magnitude of each individual gap g1, g2, g3, or g4 can be calculated using methods described previously, such as the bounding box method. Step 6032 in FIG. 18 identifies the largest gap, shown as gap 569 (in purple) in FIG. 23F. Step 6029 compares the magnitude of the largest gap 569 to threshold(s) to determine if there is an excessively large missing component of a dashed line to be designated as incorrect. Note that the actual size of the gap identified in step 6032 may not be equal to the physical gap as measured on the sketch drawn due to the use of dilated regions. Nevertheless, the method described here is sufficient to determine if there is an excessively large gap. The thresholds used in step 6029 can be selected based upon dilation values used or other factors. Finally, in step 6034, the sketch is graded as "correct" or "incorrect" based upon the comparisons done.

Feedback to a student can be provided if a sketch with dashed and solid lines in the solution is drawn incorrectly. A hint can be provided that only shows the correctly drawing components of the sketch. For the sketch shown in FIG. 23A, a hint can contain the green elements, with solid line 568 and dashed line 570 shown in FIG. 23H. The element 568 represents the correctly drawn portion of the solid line solution, which can be determined from the sketch image 550 (FIG. 23A) that is inside region 546 (FIG. 23B). Dashed line element 570 represents the correctly drawn portion of the dashed line solution 534 (FIG. 23D). Element 570 can be determined from the component of the sketch image 550 that is inside region 544 (or alternatively region 543) where the magnitude of the identified dashes 558 are below thresholds for being deemed excessively long.

FIG. 24B provides an example of hint feedback for a sketch where there is an excessively long dash 576 in a location where a dashed line should have been drawn. Student sketch image 574, shown in FIG. 24A, includes an excessively long dash 576, which would be identified in step 6008 of FIG. 17 or step 6027 of FIG. 18. A hint can be provided to display only the correctly drawn components of the sketch. For the sketch shown in FIG. 24A, a hint can contain the correctly drawn solid line 568 and dashed line 570, shown in green in FIG. 24B. For the student sketches of FIG. 23A and FIG. 24A, the hint feedback may be similar, but a student who drew FIG. 23A may notice that less of their drawing is shown as correct, since the portion of their drawing identified as an excessively long gap 569 is not included in the hint feedback.

Another form of feedback is a peek at the solution that lets the student know where their mistakes were. An example of the peek feedback for sketch 550 of FIG. 23A includes elements 552, 556, 568, 570 and 572 in FIG. 23H. As with solid line assignments, the correctly drawn solid line components 568, i.e., the top horizontal line, right vertical line, bottom horizontal line, and left partial horizontal line, are shown in green. Missing solid line image components 556 can be drawn in blue, and the additional solid line image components 552 are shown in red. The correctly drawn dashes 570 are shown in green. A complete peek should also show any dashes that are missing from the sketch 550 as drawn. To identify the missing dashes, a region 566 shown in FIG. 23G can be defined by dilating excessively long gaps 569, as shown in FIG. 23F. Missing dashes can be identified by determining which components of the visually correct solution image 530 are missing from region 566. The identified missing dashes 572 shown in FIG. 23H can be displayed in blue to indicate that they are part of the solution that was not drawn.

FIG. 24B provides an example of peek feedback for the sample sketch 574 of FIG. 24A, in which there is an excessively long dash 576 in a location where a dashed line should have been drawn. The excessively long dash 576 can be identified in step 6008 of FIG. 17 or steps 6028 and 6027 of FIG. 18. Here, the correctly drawn dashes can be determined by dilating the excessively long dash(es) 576 to create a region representing excessively long dashes, then identifying the components of the visually correct solution image 530 (FIG. 23G) that are inside this region. This image of correct dashes 578 can be drawn in distinct color, such as purple as shown in FIG. 24B, to indicate they are a mistake in the submitted sketch because solid lines were drawn where dashed lines should have been.

The feedback images for assignments with solid and dashed lines in the solutions can include portions of the correct sketch as shown in FIG. 2H and FIG. 2J for assignments that only involve solid lines in the solution. The same methods can be used to identify credited components of the solution image that correspond to correctly drawn portions of the sketch. Furthermore, errors in dashed line portions of a sketch can be represented in feedback to the students in a variety of ways in addition to those shown in FIG. 23H and FIG. 24B. For example, errors in dashed lines could be represented by highlights or colors in the region of the errors without showing specific dashes of the solution.

As will be readily apparent to those of skill in the art, the use of color coding in hint and feedback images as described herein, with reference to either solid, dashed, or combination line images, is intended solely as an illustrative example. In other words, the above-described examples that employ green, red, blue and/or purple lines to indicate correct lines or errors, are exemplary only. The key is to provide a scheme for indicating types of errors in a way that can be easily recognized by the student. Accordingly, different colors, or other different visually distinguishable indicators may be used to provide information to the student that certain portions of a sketch are correct, other portions are missing from the correct solution, and still other portions are extra and not part of the correct solution. To provide one example of an alternative approach that might be used in a monochromatic display, the correct portion of a sketch could be unmarked, appearing simply as the lines as drawn, while the additional components could have several plus signs ("+") superimposed along the length of the extra portions of the line, and the missing components could have multiple zeroes ("0") or minus signs ("-") superimposed along the length of the correct solution. Different combinations of colors and/or symbols may be used to allow the student to recognize the location and nature of the sketch errors. A legend describing the color/symbol meaning may be provided at the beginning of the lesson or displayed along with the feedback image for quick reference.

While many examples described herein use only straight lines in the solution, the methods presented herein can be similarly applied to other shapes including circles, ellipses and curved lines. To provide one example, FIG. 25A shows a sketch solution 584 that includes a straight solid line 584A, a straight dashed line 584B and a circular dashed line 580. FIG. 25B shows the region 583 that corresponds to the solution region for dashed line locations of straight line 584B, and region 582 corresponds to the solution region for dashed line locations of the circular dashed line 580.

The figures in this document depict 2D sketches and drawings. However, as described previously a sketch may be 3D using a 3D input device. The same approaches described for 2D sketches can also be applied for 3D sketches with proper accommodation for the image processing methods used. In 3D, pixels would represent a volume element, also known as a voxel. Connectedness between pixels can occur along all 3 dimensions as described in the MATLAB® command "bwconncomp." Solution regions and sketch regions would be represented by 3D volumes. Dilation and erosion commands would be done with 3D structural elements as described in the MATLAB® commands "imdilate" and "imerode."

While the foregoing drawings and descriptions set forth functional aspects of the disclosed systems, no particular arrangement of software for implementing these algorithms or functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a dedicated computing device or specific computing device or particular aspect or component of a specific computing device. It will further be appreciated that one or more of the processes may be realized as a computer executable code capable of being embodied as a machine-readable medium.

While the foregoing written description contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

The invention claimed is:

1. A method of providing guidance to a user of a computer-implemented educational sketching system, the method comprising:
   (a) receiving in a computing device via a device interface a user-generated image created by the user in response to a learning assignment, wherein the computing device generates a graphical display comprising groupings of pixels within the graphical display, each grouping of pixels comprising an element of the user-generated image;
   (b) comparing the user-generated image to a solution image stored within the computing device to identify one or more errors in the user-generated image relative to the solution image, wherein the one or more errors comprise one or more of additional image elements and missing image elements, wherein the comparing comprises, for each element of the solution image:
      (i) providing a solution region comprising an area encompassing each element of the solution image, the solution region corresponding to an acceptable variation from the solution image; and
      (ii) identifying one or more errors based on a presence or absence of at least a portion of a corresponding element of the user-generated image within the solution region;
   (c) if one or more errors are identified, determining a magnitude of each error and comparing the magnitude of the error to a threshold;
   (d) indicating a non-passing status if the magnitude of the error exceeds the threshold;
   (e) if non-passing status is indicated, generating at least one graphical hint for display to the user, the at least one graphical hint comprising one or more of: (i) at least a portion of the error within the user-generated image, (ii) at least a portion of correct elements of the user-generated image, and (iii) at least a portion of the solution image;
   (f) generating a prompt to the user to input a new user-generated image;
   (g) repeating steps (a) through (f) until a passing status is achieved; and
   (h) displaying an indication of the passing status of the user-generated image on the graphical display.

2. The method of claim 1, wherein the device interface is selected from the group consisting of a touchscreen, a computer mouse, a trackball, a camera, an image scanner, and a motion sensor.

3. The method of claim 2, wherein the display device comprises the device interface, and wherein the device interface is a touchscreen.

4. The method of claim 1, wherein the user-generated image comprises one or more user-generated elements, each user-generated element comprising a corresponding contiguous grouping of pixels, wherein the solution region comprises a set of pixels, wherein the error is identified as a missing image element when a portion of the user-generated element is not present within the set of pixels.

5. The method of claim 1, wherein the user-generated image comprises one or more user-generated elements, each user-generated element comprising a corresponding contiguous grouping of pixels, wherein the solution region comprises a set of pixels, wherein the error is identified as an additional image element when a portion of the user-generated elements is present outside of the pixel region.

6. The method of claim 1, wherein the solution image comprises one or more dashed lines and the solution region comprises a dashed line solution region, wherein the error is identified as an excessively long dash when the user-generated element corresponding to the dashed line has one or more dashes within the dashed line solution region having a magnitude that exceeds a threshold for an acceptable dash.

7. The method of claim 1, wherein the solution image comprises one or more dashed lines, wherein the solution region comprises a dashed line solution region, wherein the error is identified as an excessively long gap when the user-generated element corresponding to the dashed line has one or more gaps with a magnitude that exceeds a threshold for an acceptable gap.

8. The method of claim 1, wherein the at least one hint comprises a visually encoded image displaying a solution image having visually distinguishable indicators corresponding to one or more of correct, missing and additional user-generated elements.

9. The method of claim 8, wherein the visually perceptible indicators comprise color coded lines, wherein a different color corresponds to each of correct, missing, and additional elements.

10. The method of claim 1, wherein the at least one hint comprises a visually encoded image displaying the user-generated image with additional visually distinguishable indicators of missing and/or additional components.

11. The method of claim 10, wherein the visually perceptible indicators comprise color coded lines, wherein a different color corresponds to each of correct, missing, and additional lines.

12. The method of claim 1, wherein the at least one hint comprises portions of the solution image corresponding to the correct elements of the user-generated image.

13. The method of claim 12, wherein the at least one hint further comprises visually distinguishable image elements corresponding to portions of the solution image that are missing from the user-generated image.

14. The method of claim 12, wherein the at least one hint further comprises visually distinguishable image elements corresponding to portions of the user-generated image that are not part of the solution image.

15. An interactive sketch education system comprising:
   a computing device having a device processor and a device memory;
   a device interface associated with the computing device, the device interface configured for entry of a user-generated image created by a user in response to a learning assignment, wherein the device processor has associated therewith a set of non-transitory instructions configured to cause the device processor to execute the steps of:
      (a) receiving the user-generated image and generating a graphical display thereof comprising groupings of pixels, each grouping of pixels comprising an element of the user-generated image;
      (b) comparing the user-generated image to a solution image stored within the device memory to identify one or more errors in the user-generated image relative to the solution image, wherein the one or more errors comprise one or more of additional image elements and missing image elements, wherein the comparing comprises, for each element of the solution image:

(i) providing a solution region comprising an area encompassing each element of the solution image, the solution region corresponding to an acceptable variation from the solution image; and (ii) identifying one or more errors based on a presence or absence of at least a portion of a corresponding element of the user-generated image within the solution region;

(c) if one or more errors are identified, determining a magnitude of each error and comparing the magnitude of each error to a corresponding threshold;

(d) indicating a non-passing status if the magnitude of each error exceeds the threshold;

(e) if non-passing status is indicated, generating at least one graphical hint for display to the user, the at least one graphical hint comprising one or more of: (i) at least a portion of the error within the user-generated image, iii) at least a portion of correct elements of the user-generated image, and (iii) at least a portion of the solution image;

(f) generating a prompt to the user to input a new user-generated image;

(g) repeating steps (a) through (f) until a passing status is achieved; and (h) displaying an indication of the passing status of the user-generated image on the graphical display.

16. The system of claim 15, wherein the device interface is selected from the group consisting of a touchscreen, a computer mouse, a trackball, a camera, an image scanner, and a motion sensor.

17. The system of claim 15, wherein the user-generated image comprises one or more user-generated elements, each user-generated element comprising a corresponding contiguous grouping of pixels, wherein the solution region comprises a set of pixels, wherein the error is identified as a missing image element when a portion of the user-generated element is not present within the set of pixels.

18. The system of claim 15, wherein the user-generated image comprises one or more user-generated elements, each user-generated element comprising a corresponding contiguous grouping of pixels, wherein the solution region comprises a set of pixels, wherein the error is identified as an additional image element when a portion of the user-generated elements is present outside of the pixel region.

19. The system of claim 15, wherein the solution image comprises one or more dashed lines and the solution region comprises a dashed line solution region, wherein the error is identified as an excessively long dash when the user-generated element corresponding to the dashed line has one or more dashes within the dashed line solution region having a magnitude that exceeds a threshold for an acceptable dash.

20. The system of claim 15, wherein the solution image comprises one or more dashed lines, wherein the solution region comprises a dashed line solution region, wherein the error is identified as an excessively long gap when the user-generated element corresponding to the dashed line has one or more gaps with a magnitude that exceeds a threshold for an acceptable gap.

21. The system of claim 15, wherein the at least one hint comprises a visually encoded image displaying a solution image having visually distinguishable indicators corresponding to one or more of correct, missing and additional user-generated elements.

22. The system of claim 21, wherein the visually perceptible indicators comprise color coded lines, wherein a different color corresponds to each of correct, missing, and additional elements.

23. The system of claim 15, wherein the at least one hint comprises a visually encoded image displaying the user-generated image with additional visually distinguishable indicators of missing and/or additional components.

24. The system of claim 23 wherein the visually perceptible indicators comprise color coded lines, wherein a different color corresponds to each of correct, missing, and additional lines.

25. The system of claim 15, wherein the at least one hint comprises portions of the solution image corresponding to the correct elements of the user-generated image.

26. The system of claim 25, wherein the at least one hint further comprises visually distinguishable image elements corresponding to portions of the solution image that are missing from the user-generated image.

27. The system of claim 25, wherein the at least one hint further comprises visually distinguishable image elements corresponding to portions of the user-generated image that are not part of the solution image.

28. A method of providing guidance to a user of a computer-implemented educational sketching system comprising:

(a) receiving in a computing device via a device interface a user-generated image created by a user in response to a learning assignment, wherein the computing device generates a graphical display comprising groupings of pixels within the graphical display, each grouping of pixels comprising an element of the user-generated image;

(b) comparing the user-generated image to a solution image stored within the computing device to identify one or more errors in the user-generated image relative to the solution image, wherein the one or more errors comprise one or more of additional image elements and missing image elements, wherein the comparing comprises, for each element of the solution image:

(i) providing a solution region comprising an area encompassing each element of the solution image, the solution region corresponding to an acceptable variation from the solution image; and (ii) identifying one or more errors based on a presence or absence of at least a portion of a corresponding element of the user-generated image within the solution region;

(c) if one or more errors are identified, determining a magnitude of each error and comparing the magnitude of the error to a threshold;

(d) indicating a non-passing status if the magnitude of the error exceeds the threshold;

(e) if non-passing status is indicated, generating at least one graphical hint for display to the user, the at least one graphical hint comprising one or more of: (i) at least a portion of the error within the user-generated image, (ii) at least a portion of correct elements of the user-generated image, and (iii) at least a portion of the solution image;

(f) generating a prompt to the user to input a new user-generated image;

(g) repeating steps (a) through (f) until the magnitude of the error does not exceed the threshold and a passing status is achieved; and (h) displaying an indication of the passing status of the user-generated image on the graphical display.

29. The method of claim 28, wherein the at least one hint further comprises visually distinguishable image elements corresponding to portions of the solution image that are missing from the user-generated image.

30. The method of claim 28, wherein the at least one hint further comprises visually distinguishable image elements corresponding to portions of the user-generated image that are not part of the solution image.

31. A method of providing guidance to a user of a computer-implemented educational sketching system comprising:
(a) receiving in a computing device via a device interface a user-generated image created by a user in response to a learning assignment, wherein the computing device generates a graphical display comprising groupings of pixels within the graphical display, each grouping of pixels comprising an element of the user-generated image;
(b) comparing the user-generated image to a solution image stored within the computing device to identify one or more errors in the user-generated image relative to the solution image, wherein the one or more errors comprise one or more of additional image elements and missing image elements;
(c) if one or more errors are identified, indicating a non-passing status and generating at least one graphical hint for display to the user, the at least one graphical hint comprising one or more of: (i) at least a portion of the error within the user-generated image, (ii) at least a portion of correct elements of the user-generated image, and (iii) at least a portion of the solution image;
(d) generating a prompt to the user to input a new user-generated image;
(e) repeating steps (a) through (d) until a passing status is achieved; and
(f) displaying an indication of the passing status of the user-generated image on the graphical display.

32. The method of claim 31, wherein correct elements of the user-generated image correspond to elements of the user-generated image that are disposed within a specified region surrounding each element of the solution image.

* * * * *